United States Patent
Moon et al.

(10) Patent No.: US 12,069,653 B2
(45) Date of Patent: Aug. 20, 2024

(54) METHOD AND APPARATUS FOR TRANSMITTING AND RECEIVING DOWNLINK CONTROL CHANNEL IN COMMUNICATION SYSTEM

(71) Applicant: ELECTRONICS AND TELECOMMUNICATIONS RESEARCH INSTITUTE, Daejeon (KR)

(72) Inventors: Sung Hyun Moon, Daejeon (KR); Cheul Soon Kim, Daejeon (KR); Jung Hoon Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 280 days.

(21) Appl. No.: 17/307,126

(22) Filed: May 4, 2021

(65) Prior Publication Data
US 2021/0360667 A1  Nov. 18, 2021

(30) Foreign Application Priority Data

| | | | |
|---|---|---|---|
| May 13, 2020 | (KR) | ........................ | 10-2020-0057114 |
| Jan. 29, 2021 | (KR) | ........................ | 10-2021-0013647 |
| Feb. 3, 2021 | (KR) | ........................ | 10-2021-0015749 |
| Feb. 16, 2021 | (KR) | ........................ | 10-2021-0020743 |
| Apr. 29, 2021 | (KR) | ........................ | 10-2021-0055909 |

(51) Int. Cl.
*H04W 72/1273* (2023.01)
*H04L 1/08* (2006.01)
*H04W 72/23* (2023.01)

(52) U.S. Cl.
CPC ........... *H04W 72/1273* (2013.01); *H04L 1/08* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 10,178,672 B2 | 1/2019 | Choi | |
| 10,863,522 B2 * | 12/2020 | Islam | .................... H04L 5/0053 |

(Continued)

FOREIGN PATENT DOCUMENTS

| | | | | |
|---|---|---|---|---|
| CA | 3052762 A1 * | 8/2018 | ........... | H04B 7/0456 |
| WO | 2018231001 A1 | 12/2018 | | |

(Continued)

*Primary Examiner* — Kenny S Lin
*Assistant Examiner* — Rodrick Mak
(74) *Attorney, Agent, or Firm* — LRK PATENT LAW FIRM

(57) ABSTRACT

Disclosed are methods and apparatuses for transmitting and receiving downlink control channel in communication system. An operation method of a terminal in a communication system includes receiving configuration information of a resource set for a physical downlink control channel (PDCCH) monitoring operation from a base station; performing the PDCCH monitoring operation in the resource set; receiving at least one downlink control information (DCI) including scheduling information of a first physical downlink shared channel (PDSCH) by the PDCCH monitoring operation; and receiving the first PDSCH based on the scheduling information.

15 Claims, 13 Drawing Sheets

(56) References Cited

U.S. PATENT DOCUMENTS

| | | | |
|---|---|---|---|
| 11,019,623 B2* | 5/2021 | Lee | H04W 72/0453 |
| 11,751,215 B2* | 9/2023 | Moon | H04L 1/1822 370/329 |
| 2017/0033901 A1 | 2/2017 | Tavildar et al. | |
| 2019/0306700 A1* | 10/2019 | Lin | H04W 72/23 |
| 2019/0342878 A1 | 11/2019 | Kim et al. | |
| 2020/0036494 A1 | 1/2020 | He et al. | |
| 2020/0146050 A1 | 5/2020 | Akkarakaran et al. | |
| 2020/0154465 A1* | 5/2020 | Manolakos | H04W 72/23 |
| 2020/0187236 A1 | 6/2020 | Moon et al. | |
| 2020/0196346 A1 | 6/2020 | Khoshnevisan et al. | |
| 2020/0314881 A1* | 10/2020 | Bagheri | H04L 5/10 |
| 2021/0051710 A1* | 2/2021 | Cirik | H04L 5/0023 |
| 2022/0255659 A1* | 8/2022 | Feng | H04L 1/0072 |

FOREIGN PATENT DOCUMENTS

| | | | | |
|---|---|---|---|---|
| WO | 2019031813 A1 | 2/2019 | | |
| WO | WO-2021022736 A1 * | 2/2021 | | H04L 1/08 |

* cited by examiner

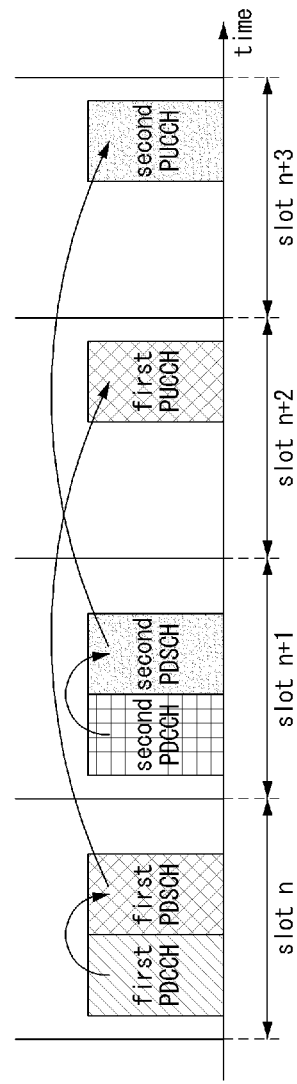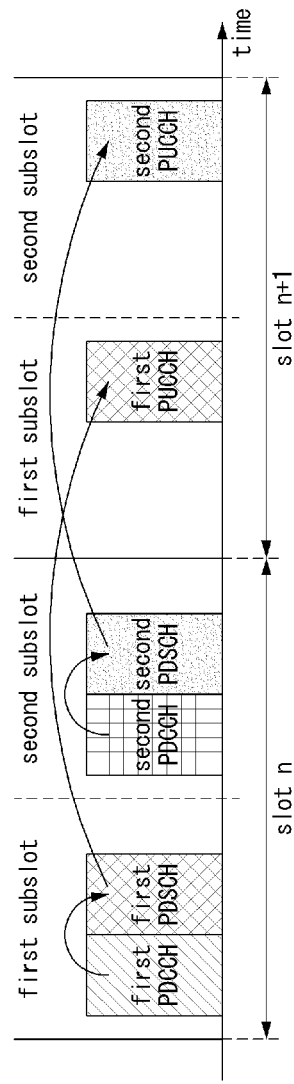

METHOD AND APPARATUS FOR TRANSMITTING AND RECEIVING DOWNLINK CONTROL CHANNEL IN COMMUNICATION SYSTEM

CROSS-REFERENCE TO RELATED APPLICATIONS

This application claims priority to Korean Patent Applications No. 10-2020-0057114 filed on May 13, 2020, No. 10-2021-0013647 filed on Jan. 29, 2021, No. 10-2021-0015749 filed on Feb. 3, 2021, No. 10-2021-0020743 filed on Feb. 16, 2021, and No. 10-2021-0055909 filed on Apr. 29, 2021 with the Korean Intellectual Property Office (KIPO), the entire contents of which are hereby incorporated by reference.

BACKGROUND

1. Technical Field

The present disclosure relates to a technique for transmitting and receiving signals in a communication system, and more specifically, to a technique for transmitting and receiving downlink control channels.

2. Description of Related Art

In order to vitalize the ecosystem of the fourth industrial revolution, new and diverse communication infrastructure markets are being pioneered. To this end, a more advanced communication system (e.g., new radio (NR) communication system) than a conventional communication system (e.g., long term evolution (LTE) communication system) is being considered. The NR communication system may support not only a frequency band below 6 GHz but also 6 GHz or higher frequency band, and may support various communication services and scenarios as compared to the LTE communication system. For example, usage scenarios of the NR communication system may include enhanced mobile broadband (eMBB), ultra-reliable low-latency communication (URLLC), massive machine type communication (mMTC), and the like. Communication technologies are needed to satisfy the various requirements of the industry.

Meanwhile, in a communication system (e.g., NR communication system), a base station may transmit a physical downlink control channel (PDCCH) including scheduling information to a terminal, and may transmit a physical downlink shared channel (PDSCH) based on the scheduling information included in the PDCCH to the terminal. The same PDCCH may be transmitted by a different transmission and reception point (TRP). In this case, methods for improving the reception performance of the PDCCH are required.

SUMMARY

Accordingly, exemplary embodiments of the present disclosure are directed to providing a method and an apparatus for transmitting and receiving downlink control channels in a communication system.

According to a first exemplary embodiment of the present disclosure, an operation method of a terminal in a communication system may comprise: receiving configuration information of a resource set for a physical downlink control channel (PDCCH) monitoring operation from a base station; performing the PDCCH monitoring operation in the resource set; receiving at least one downlink control information (DCI) including scheduling information of a first physical downlink shared channel (PDSCH) by the PDCCH monitoring operation; and receiving the first PDSCH based on the scheduling information, wherein the resource set includes a first search space and a second search space for PDCCH repeated transmissions, the first search space is used for transmission of a first DCI, and the second search space is used for transmission of a second DCI, the at least one DCI is at least one of the first DCI and the second DCI, the first DCI and the second DCI include same payload, and a format of the first DCI is identical to a format of the second DCI.

The first DCI may be received based on information on a quasi-co-location (QCL) of a first control resource set (CORESET) associated with the first search space, the second DCI may be received based on information on a QCL of the second CORESET associated with the second search space, and the information on the QCL of the first CORESET and the information on the QCL of the second CORESET may be determined independently of each other.

When a first CORESET associated with the first search space is identical to a second CORESET associated with the second search space, the first DCI and the second DCI may be received based on information on same QCL.

The first PDSCH may be received based on transmission configuration information (TCI) state information for the first PDSCH, configuration information of a first CORESET associated with the first search space may include first information indicating whether the TCI state information is included in the first DCI, configuration information of a second CORESET associated with the second search space may include second information indicating whether the TCI state information is included in the second DCI, and the first information may be identical to the second information.

When the first DCI and the second DCI do not include TCI state information for the first PDSCH, a reception operation of the first PDSCH may be performed based on an assumption that the first PDSCH has QCL relation with a CORESET having a lower identifier among the a first CORESET associated with the first search space and a second CORESET associated with the second search space.

When a number of symbols between at least one end symbol of an end symbol of the first DCI and an end symbol of the second DCI and a start symbol of the first PDSCH is less than or equal to a reference value, a reception operation of the first PDSCH may be performed based on an assumption that the first PDSCH has QCL relation with one CORESET in a latest slot including one or more CORESETs.

The one CORESET may be a first CORESET associated with the first search space or a second CORESET associated with the second search space.

The first search space and the second search space may be configured as same search space set type, and the same search space set type may be a terminal specific search space or a common search space.

A first PDCCH including the first DCI may be transmitted through a first PDCCH candidate of the first search space, a second PDCCH including the second DCI may be transmitted through a second PDCCH candidate of the second search space, and the first PDCCH candidate and the second PDCCH candidate may have same control channel element (CCE) aggregation level and same PDCCH candidate index.

The first PDCCH candidate may be configured to be connected to the second PDCCH candidate for the PDCCH repeated transmissions.

The performing the PDCCH monitoring operation may include, when the first PDCCH candidate satisfies a predefined condition, performing a monitoring operation of the second PDCCH candidate without performing a monitoring operation of the first PDCCH candidate.

The predefined condition may include at least one of a condition in which the first PDCCH candidate overlaps with a synchronization signal/physical broadcast channel (SS/PBCH) block, a condition in which the first PDCCH candidate overlaps with a physical random access channel (PRACH) resource, a condition in which the first PDCCH candidate overlaps an uplink symbol, and a condition in which the first search space is excluded from mapping by a search space mapping rule.

According to a second exemplary embodiment of the present disclosure, an operation method of a base station in a communication system may comprise: transmitting configuration information of a resource set for a physical downlink control channel (PDCCH) monitoring operation to a terminal; transmitting at least one downlink control information (DCI) including scheduling information of a first physical downlink shared channel (PDSCH) in the resource set to the terminal; and transmitting the first PDSCH to the terminal based on the scheduling information, wherein the resource set includes a first search space and a second search space for PDCCH repeated transmissions, the first search space is used for transmission of a first DCI, and the second search space is used for transmission of a second DCI, the at least one DCI is at least one of the first DCI and the second DCI, the first DCI and the second DCI include same payload, and a format of the first DCI is identical to a format of the second DCI.

Information on a quasi-co-location (QCL) of a first control resource set (CORESET) associated with the first search space may be determined independently from information on a QCL of a second CORESET associated with the second search space.

The configuration information of a first CORESET associated with the first search space may include first information indicating whether transmission configuration information (TCI) state information is included in the first DCI, configuration information of a second CORESET associated with the second search space may include second information indicating whether the TCI state information is included in the second DCI, and the first information may be identical to the second information.

When the first DCI and the second DCI do not include TCI state information for the first PDSCH, a reception operation of the first PDSCH in the terminal may be performed based on an assumption that the first PDSCH has QCL relation with a CORESET having a lower identifier among the a first CORESET associated with the first search space and a second CORESET associated with the second search space.

When a number of symbols between at least one end symbol of an end symbol of the first DCI and an end symbol of the second DCI and a start symbol of the first PDSCH is less than or equal to a reference value, a reception operation of the first PDSCH in the terminal may be performed based on an assumption that the first PDSCH has QCL relation with one CORESET in a latest slot including one or more CORESETs.

The first search space and the second search space may be configured as same search space set type, and the same search space set type may be a terminal specific search space or a common search space.

A first PDCCH including the first DCI may be transmitted through a first PDCCH candidate of the first search space, a second PDCCH including the second DCI may be transmitted through a second PDCCH candidate of the second search space, and the first PDCCH candidate and the second PDCCH candidate may have same control channel element (CCE) aggregation level and same PDCCH candidate index.

The first PDCCH candidate may be configured to be connected to the second PDCCH candidate for the PDCCH repeated transmissions.

According to the exemplary embodiments of the present disclosure, the same PDCCH may be repeatedly transmitted. The same PDCCH may be transmitted by different TRPs. When all the repeatedly-transmitted PDCCHs are received, the terminal may perform a soft combining operation on the received PDCCHs. Even when only one PDCCH among the repeatedly-transmitted PDCCHs is received, the terminal may receive a PDSCH based on the received DCI. According to the above-described operations, reception performance of the PDCCH and PDSCH can be improved.

BRIEF DESCRIPTION OF DRAWINGS

Exemplary embodiments of the present disclosure will become more apparent by describing in detail embodiments of the present disclosure with reference to the accompanying drawings, in which:

FIG. 11A is a conceptual diagram illustrating a first exemplary embodiment of an HARQ-ACK transmission method for the same TB and a plurality of PDSCHs;

FIG. 11B is a conceptual diagram illustrating a second exemplary embodiment of an HARQ-ACK transmission method for the same TB and a plurality of PDSCHs;

Figure 1:
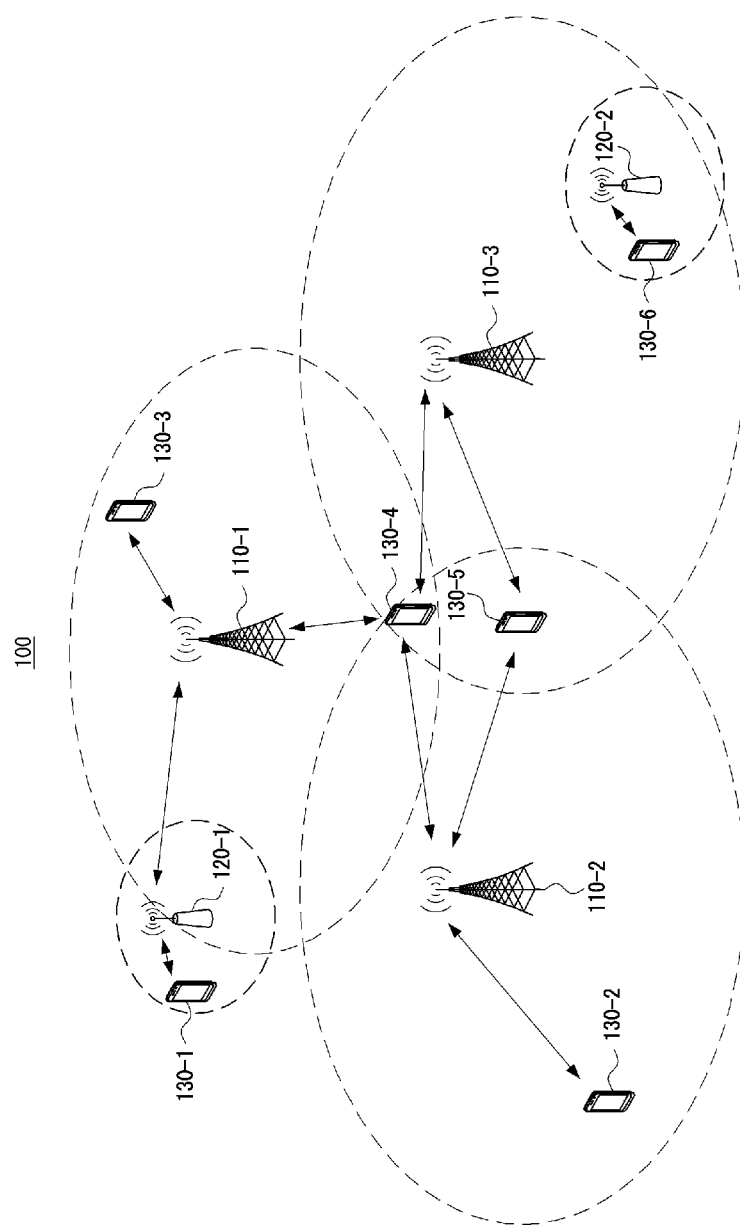
FIG. 1 is a conceptual diagram illustrating a first exemplary embodiment of a communication system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system may be the 4G communication system (e.g., Long-Term Evolution (LTE) communication system or LTE-A communication system), the 5G communication system (e.g., New Radio (NR) communication system), or the like. The 4G communication system may support communications in a frequency band of 6 GHz or below, and the 5G communication system may support communications in a frequency band of 6 GHz or above as well as the frequency band of 6 GHz or below. The communication system to which the exemplary embodiments according to the present disclosure are applied is not limited to the contents described below, and the exemplary embodiments according to the present disclosure may be applied to various communication systems. Here, the communication system may be used in the same sense as a communication network, 'LTE' may refer to '4G communication system', 'LTE communication system', or 'LTE-A communication system', and 'NR' may refer to '5G communication system' or 'NR communication system'.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g., a serving gateway (S-GW), a packet data network (PDN) gateway (P-GW), and a mobility management entity (MME)). When the communication system 100 is a 5G communication system (e.g., New Radio (NR) system), the core network may include an access and mobility management function (AMF), a user plane function (UPF), a session management function (SMF), and the like.

The plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
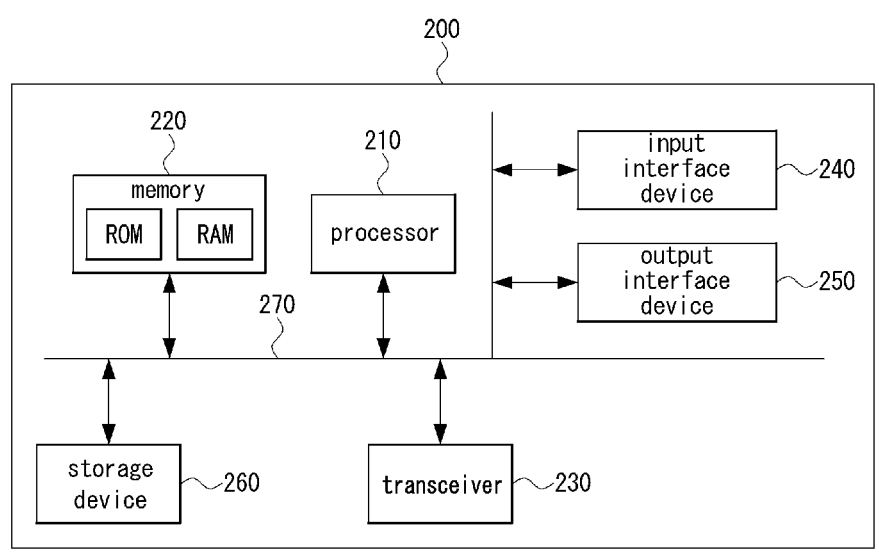
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring back to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like.

Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Methods of transmitting and receiving signals (e.g., downlink control channel(s)) in a communication system will be described. The following exemplary embodiments may be applied to the NR communication system. In addition, the following exemplary embodiments may be applied not only to the NR communication system but also to other communication systems (e.g., LTE communication system, fifth generation (5G) communication system, sixth generation (6G) communication system, or the like).

A numerology applied to physical signals and channels in the communication system (e.g., NR communication system) may be variable. The numerology may vary to satisfy various technical requirements of the communication system. In the communication system to which a cyclic prefix (CP) based OFDM waveform technology is applied, the numerology may include a subcarrier spacing and a CP length (or CP type). Table 1 below may be a first exemplary embodiment of configuration of numerologies for the CP-based OFDM. Adjacent subcarrier spacings may have an exponential multiplication relationship of 2, and the CP length may be scaled at the same ratio as the OFDM symbol length. Depending on a frequency band in which the communication system operates, at least some numerologies among the numerologies of Table 1 may be supported. In addition, in the communication system, numerologies not listed in Table 1 may be further supported. CP type(s) not listed in Table 1 (e.g., extended CP) may be additionally supported for a specific subcarrier spacing (e.g., 60 kHz).

TABLE 1

| Subcarrier spacing | 15 kHz | 30 kHz | 60 kHz | 120 kHz | 240 kHz | 480 kHz |
|---|---|---|---|---|---|---|
| OFDM symbol length [µs] | 66.7 | 33.3 | 16.7 | 8.3 | 4.2 | 2.1 |
| CP length [µs] | 4.76 | 2.38 | 1.19 | 0.60 | 0.30 | 0.15 |
| Number of OFDM symbols within 1 ms | 14 | 28 | 56 | 112 | 224 | 448 |

In the following description, a frame structure in the communication system will be described. In the time domain, elements constituting a frame structure may include a subframe, slot, mini-slot, symbol, and the like. The subframe may be used as a unit for transmission, measurement, and the like, and the length of the subframe may have a fixed value (e.g., 1 ms) regardless of a subcarrier spacing. A slot may comprise consecutive symbols (e.g., 14 OFDM symbols). The length of the slot may be variable differently from the length of the subframe. For example, the length of the slot may be inversely proportional to the subcarrier spacing.

A slot may be used as a unit for transmission, measurement, scheduling, resource configuration, timing (e.g., scheduling timing, hybrid automatic repeat request (HARD) timing, channel state information (CSI) measurement and reporting timing, etc.), and the like. A length of an actual time resource used for transmission, measurement, scheduling, resource configuration, etc. may not match the length of a slot. A mini-slot may include consecutive symbol(s), and a length of a mini-slot may be shorter than a length of a slot. A mini-slot may be used as a unit for transmission, measurement, scheduling, resource configuration, timing, and the like. A mini-slot (e.g., the length of a mini-slot, a mini-slot boundary, etc.) may be predefined in the technical specification. Alternatively, a mini-slot (e.g., a length of a mini-slot, a mini-slot boundary, etc.) may be configured (or indicated) to the terminal. When a specific condition is satisfied, use of a mini-slot may be configured (or indicated) to the terminal.

The base station may schedule a data channel (e.g., physical downlink shared channel (PDSCH), physical uplink shared channel (PUSCH), physical sidelink shared channel (PSSCH)) using some or all of symbols constituting a slot. In particular, for URLLC transmission, unlicensed band transmission, transmission in a situation where an NR communication system and an LTE communication system coexist, and multi-user scheduling based on analog beamforming, a data channel may be transmitted using a portion of a slot. In addition, the base station may schedule a data channel using a plurality of slots. In addition, the base station may schedule a data channel using at least one mini-slot.

In the frequency domain, elements constituting the frame structure may include a resource block (RB), subcarrier, and the like. One RB may include consecutive subcarriers (e.g., 12 subcarriers). The number of subcarriers constituting one RB may be constant regardless of a numerology. In this case, a bandwidth occupied by one RB may be proportional to a subcarrier spacing of a numerology. An RB may be used as a transmission and resource allocation unit for a data channel, control channel, and the like. Resource allocation of a data channel may be performed in units of RBs or RB groups (e.g., resource block group (RBG)). One RBG may include one or more consecutive RBs. Resource allocation of a control channel may be performed in units of control channel elements (CCEs). One CCE in the frequency domain may include one or more RBs.

In the NR communication system, a slot (e.g., slot format) may be composed of a combination of one or more of downlink period, flexible period (or unknown period), and an uplink period. Each of a downlink period, flexible period, and uplink period may be comprised of one or more consecutive symbols. A flexible period may be located between a downlink period and an uplink period, between a first downlink period and a second downlink period, or between a first uplink period and a second uplink period. When a flexible period is inserted between a downlink period and an uplink period, the flexible period may be used as a guard period.

A slot may include one or more flexible periods. Alternatively, a slot may not include a flexible period. The terminal may perform a predefined operation in a flexible period. Alternatively, the terminal may perform an operation configured by the base station semi-statically or periodically. For example, the operation configured by the base station periodically may include a PDCCH monitoring operation, synchronization signal/physical broadcast channel (SS/PBCH) block reception and measurement operation, channel state information-reference signal (CSI-RS) reception and measurement operation, downlink semi-persistent scheduling (SPS) PDSCH reception operation, sounding reference signal (SRS) transmission operation, physical random access channel (PRACH) transmission operation, periodically-configured PUCCH transmission operation, PUSCH transmission operation according to a configured grant, and the like. A flexible symbol may be overridden by a downlink symbol or an uplink symbol. When a flexible symbol is overridden by a downlink or uplink symbol, the terminal may perform a new operation instead of the existing operation in the corresponding flexible symbol (e.g., overridden flexible symbol).

A slot format may be configured semi-statically by higher layer signaling (e.g., radio resource control (RRC) signaling). Information indicating a semi-static slot format may be included in system information, and the semi-static slot format may be configured in a cell-specific manner. In addition, a semi-static slot format may be additionally configured for each terminal through terminal-specific higher layer signaling (e.g., RRC signaling). A flexible symbol of a slot format configured cell-specifically may be overridden by a downlink symbol or an uplink symbol by terminal-specific higher layer signaling. In addition, a slot format may be dynamically indicated by physical layer signaling (e.g., slot format indicator (SFI) included in downlink control information (DCI)). The semi-statically configured slot format may be overridden by a dynamically indicated slot format. For example, a semi-static flexible symbol may be overridden by a downlink symbol or an uplink symbol by SFI.

The base station and the terminal may perform downlink operations, uplink operations, and sidelink operations in a bandwidth part. A bandwidth part may be defined as a set of consecutive RBs (e.g., physical resource blocks (PRBs)) having a specific numerology in the frequency domain. RBs constituting one bandwidth part may be consecutive in the frequency domain. One numerology may be used for transmission of signals (e.g., transmission of control channel or data channel) in one bandwidth part. In exemplary embodiments, when used in a broad sense, a 'signal' may refer to any physical signal and channel. A terminal performing an initial access procedure may obtain configuration information of an initial bandwidth part from the base station through system information. A terminal operating in an RRC connected state may obtain the configuration information of the bandwidth part from the base station through terminal-specific higher layer signaling.

The configuration information of the bandwidth part may include a numerology (e.g., a subcarrier spacing and a CP length) applied to the bandwidth part. Also, the configuration information of the bandwidth part may further include information indicating a position of a start RB (e.g., start PRB) of the bandwidth part and information indicating the number of RBs (e.g., PRBs) constituting the bandwidth part. At least one bandwidth part among the bandwidth part(s) configured in the terminal may be activated. For example, within one carrier, one uplink bandwidth part and one downlink bandwidth part may be activated respectively. In a time division duplex (TDD) based communication system, a pair of an uplink bandwidth part and a downlink bandwidth part may be activated. The base station may configure a plurality of bandwidth parts to the terminal within one carrier, and may switch the active bandwidth part of the terminal.

In exemplary embodiments, an RB may mean a common RB (CRB). Alternatively, an RB may mean a PRB or a virtual RB (VRB). In the NR communication system, a CRB may refer to an RB constituting a set of consecutive RBs (e.g., common RB grid) based on a reference frequency (e.g., point A). Carriers, bandwidth part, and the like may be arranged on the common RB grid. That is, a carrier, bandwidth part, etc. may be composed of CRB(s). An RB or CRB constituting a bandwidth part may be referred to as a PRB, and a CRB index within the bandwidth part may be appropriately converted into a PRB index. In an exemplary embodiment, an RB may refer to an interlace RB (IRB).

A minimum resource unit constituting a PDCCH may be a resource element group (REG). An REG may be composed of one PRB (e.g., 12 subcarriers) in the frequency domain and one OFDM symbol in the time domain. Thus, one REG may include 12 resource elements (REs). A demodulation reference signal (DMRS) for demodulating a PDCCH may be mapped to 3 REs among 12 REs constituting the REG, and control information (e.g., modulated DCI) may be mapped to the remaining 9 REs.

One PDCCH candidate may be composed of one CCE or aggregated CCEs. One CCE may be composed of a plurality of REGs. The NR communication system may support CCE aggregation levels 1, 2, 4, 8, 16, and the like, and one CCE may consist of six REGs.

A control resource set (CORESET) may be a resource region in which the terminal performs a blind decoding on PDCCHs. The CORESET may be composed of a plurality of REGs. The CORESET may consist of one or more PRBs in the frequency domain and one or more symbols (e.g., OFDM symbols) in the time domain. The symbols constituting one CORESET may be consecutive in the time domain. The PRBs constituting one CORESET may be consecutive or non-consecutive in the frequency domain. One DCI (e.g., one DCI format or one PDCCH) may be transmitted within one CORESET. A plurality of CORESETs may be configured with respect to a cell and a terminal, and the plurality of CORESETs may overlap in time-frequency resources.

A CORESET may be configured in the terminal by a PBCH (e.g., system information transmitted through the PBCH). The identifier (ID) of the CORESET configured by the PBCH may be 0. That is, the CORESET configured by the PBCH may be referred to as a CORESET #0. A terminal operating in an RRC idle state may perform a monitoring operation in the CORESET #0 in order to receive a first PDCCH in the initial access procedure. Not only terminals operating in the RRC idle state but also terminals operating in the RRC connected state may perform monitoring operations in the CORESET #0. The CORESET may be configured in the terminal by other system information (e.g., system information block type 1 (SIB1)) other than the system information transmitted through the PBCH. For example, for reception of a random access response (or Msg2) in a random access procedure, the terminal may receive the SIB1 including the configuration information of the CORESET. Also, the CORESET may be configured in the terminal by terminal-specific higher layer signaling (e.g., RRC signaling).

In each downlink bandwidth part, one or more CORESETs may be configured for the terminal. The terminal may monitor PDCCH candidate(s) for a CORESET configured in a downlink active bandwidth part in the corresponding downlink active bandwidth part. Alternatively, the terminal may monitor PDCCH candidate(s) for a CORESET (e.g., CORESET #0) configured in a downlink bandwidth part other than a downlink active bandwidth part in the downlink active bandwidth part. The initial downlink active bandwidth part may include the CORESET #0 and may be associated with the CORESET #0. The CORESET #0 having a quasi-co-location (QCL) relation with an SS/PBCH block may be configured for the terminal in a primary cell (PCell), a secondary cell (SCell), and a primary secondary cell (PSCell). In the secondary cell (SCell), the CORESET #0 may not be configured for the terminal.

A search space may be a set of candidate resource regions through which PDCCHs can be transmitted. The terminal may perform a blind decoding on each of the PDCCH candidates within a predefined search space. The terminal may determine whether a PDCCH is transmitted to itself by performing a cyclic redundancy check (CRC) on a result of the blind decoding. When it is determined that a PDCCH is a PDCCH for the terminal itself, the terminal may receive the PDCCH. The terminal may periodically monitor a search space, and may monitor a search space at one or more time positions (e.g., PDCCH monitoring occasions, CORESETs) within one period.

A PDCCH candidate may be configured with CCEs selected by a predefined hash function within an occasion of the CORESET or the search space. The search space may be defined and configured for each CCE aggregation level. In this case, a set of search spaces for all CCE aggregation levels may be referred to as a 'search space set'. In exemplary embodiments, 'search space' may mean 'search space set', and 'search space set' may mean 'search space'.

A search space set may be logically associated with or corresponded to one CORESET. One CORESET may be logically associated with or corresponded to one or more search space sets. A search space set for transmitting a common DCI or a group-common DCI may be referred to as a common search space set (hereinafter, referred to as 'CSS set'). A common DCI or a group-common DCI may include resource allocation information of a PDSCH for system information transmission, paging information, a power control command, SFI, a preemption indicator, and/or the like. In case of the NR communication system, a common DCI may correspond to DCI formats 0_0, 1_0, and the like, and a cyclic redundancy check (CRC) of a common DCI transmitted to the terminal may be scrambled with a system information-radio network temporary identifier (SI-RNTI), paging-RNTI (P-RNT), random access-RNTI (RA-RNTI), temporary cell-RNTI (TC-RNTI), or the like. A group-common DCI may correspond to DCI format 2_X (X=0, 1, 2, . . . ), and a CRC of the group-common DCI transmitted to the terminal may be scrambled with a slot format indicator-RNTI (SFI-RNTI), or the like. The CSS set may include Type 0, Type 0A, Type 1, Type 2, and Type 3 CSS sets.

A search space set for transmitting a UE-specific DCI may be referred to as a UE-specific search space set (hereinafter, referred to as 'USS set'). A UE-specific DCI may include scheduling and resource allocation information for a PDSCH, PUSCH, or PSSCH. In case of the NR communication system, a UE-specific DCI may correspond to DCI formats 0_1, 0_2, 1_1, 1_2, 3_0, 3_1, and the like, and a CRC of the UE-specific DCI transmitted to the terminal may be scrambled with a C-RNTI, configured scheduling-RNTI (CS-RNTI), modulation and coding scheme-C-RNTI (MCS-C-RNTI), or the like. Considering scheduling freedom or fallback transmission, a UE-specific DCI may be transmitted even in a CSS set. In this case, a UE-specific DCI may be transmitted according to a DCI format corresponding to a common DCI. For example, the terminal may monitor a PDCCH (e.g., DCI formats 0_0, 0_1) whose CRC is scrambled with a C-RNTI, CS-RNTI, MCS-C-RNTI, or the like in a CSS set.

The type 0 CSS set may be used for reception of DCI scheduling a PDSCH including SIB1, and may be configured through a PBCH or cell-specific RRC signaling. The ID of the type 0 CSS set may be assigned or set as 0. The type 0 CSS set may be logically associated with the CORESET #0.

The terminal may assume that a PDCCH DM-RS has a QCL relation with a certain signal (e.g., SS/PBCH block, CSI-RS, PDSCH DM-RS, PDCCH DM-RS, etc.). In addition, since a PDCCH has the same antenna port as a PDCCH DM-RS, the PDCCH and the PDCCH DM-RS may have a QCL relation with each other. Accordingly, the terminal may obtain information on large-scale propagation characteristics of a radio channel experienced by the PDCCH and PDCCH DM-RS through the above-described QCL assumption, and may utilize the obtained large-scale propagation characteristics for channel estimation, reception beamforming, or the like. QCL parameters may include a delay spread, Doppler spread, Doppler shift, average gain, average delay, spatial Rx parameter, and the like. The spatial Rx parameter may correspond to characteristics such as a reception beam, a reception channel spatial correlation, and a transmission/reception beam pair. For convenience, the spatial Rx parameter may be referred to as 'spatial QCL'. A PDCCH may be used as a meaning including a PDCCH DM-RS, and an expression 'a PDCCH has a QCL relation with a signal' may include a meaning that a DM-RS of the PDCCH has a QCL relation with the signal. A signal having a QCL relation with a PDCCH or a resource of the signal may be referred to as a QCL source, QCL source signal, QCL source resource, or the like.

PDCCHs transmitted in the same CORESET, search space set(s) corresponding to the same CORESET, and/or PDCCH monitoring occasion(s) corresponding to the same CORESET may have the same QCL relation. That is, a unit of a set in which the terminal assumes the same QCL may be a CORESET, and a QCL assumption for each CORESET may be independent. In an exemplary embodiment, a QCL, a QCL source, etc. of a certain CORESET may mean a QCL, a QCL source, etc. of a PDCCH received through the corresponding CORESET, respectively. Exceptionally, different QCL assumptions may be applied to search space sets corresponding to one CORESET. For example, a search space set (e.g., type 1 CSS set) for monitoring an RA-RNTI and other search space sets may have different QCL relations.

A QCL relation or QCL assumption (e.g., QCL source, QCL type, etc.) of a CORESET may be determined by a predefined method. For example, the terminal may assume that a PDCCH DM-RS received through a certain CORESET or a certain search space set has, with respect to a predefined QCL type, a QCL relation with an SS/PBCH block and/or CSI-RS selected when performing an initial access or random access procedure. Here, the QCL type may refer to a set of one or more QCL parameter(s). Alternatively, a QCL relation or QCL assumption (e.g., QCL source, QCL type, etc.) of a CORESET may be signaled from the base station to the terminal (e.g., through one or a combination of two or more among RRC signaling, medium access control (MAC) control element (CE) signaling, and DCI signaling). That is, the base station may configure a transmission configuration information (TCI) state for a CORESET to the terminal. In general, a TCI state may include at least one of an ID of a signal (e.g., a QCL source or QCL source resource of a PDCCH DM-RS) having a QCL relation with a DM-RS (e.g., PDCCH DM-RS) of a physical channel to which the TCI is applied and/or a QCL type therefor. That is, the TCI state may include one or more {ID and/or QCL type}(s). For example, the base station may configure one or more TCI state candidates for each CORESET through RRC signaling to the terminal, and may indicate or configure one TCI state used for CORESET monitoring of the terminal among the one or more TCI state candidates through MAC signaling (or DCI signaling). When there is one TCI state candidate configured by RRC signaling, the MAC signaling procedure (or DCI signaling procedure) may be omitted. The terminal may perform a PDCCH monitoring and reception operation for the corresponding CORESET based on the TCI state configuration information received from the base station.

Meanwhile, in a communication system, beam operations in a high-frequency band and a low-frequency band may be different from each other. Since a path loss of a signal by a channel is relatively small in a low frequency band (e.g., a band below 6 GHz), the signal may be transmitted and received using a beam having a wide beamwidth. In particular, in case of a control channel, the entire coverage of a cell (or sector) may be covered even with a single beam. However, in a high frequency band (e.g., a band above 6 GHz) where a path loss of a signal is large, beamforming by a large-scale antenna may be used to extend a signal reach. In addition, beamforming may be applied not only to a data channel but also to a common signal and a control channel. A communication node (e.g., base station) may form a beam having a narrow beamwidth through a plurality of antennas, and transmit and receive signals multiple times by using a plurality of beams having different directivities to cover the entire spatial area of a cell (or sector). Such an operation of repeatedly transmitting a signal over a plurality of time resources using a plurality of beams may be referred to as a 'beam sweeping operation'. A system for transmitting a signal using a plurality of beams having such a narrow beamwidth may be referred to as a 'multi-beam system'.

The multi-beam system may operate based on beam management. The terminal may measure a beam quality for a received signal (e.g., SS/PBCH block, CSI-RS, etc.), and may report a measurement result of the beam quality to the base station. For example, the terminal may calculate a beam quality measurement value such as a reference signal received power (RSRP), signal-to-interference-plus-noise ratio (SINR), etc. for each beam (e.g., each signal, each resource), and report optimal beam(s) and measurement value(s) corresponding thereto to the base station. The base station may determine a transmission beam for the terminal based on the measurement information of the beam quality received from the terminal. In addition, the base station may configure a TCI state for reception of physical signals and channels (e.g., PDCCH, PDSCH, CSI-RS, PUCCH, PUSCH, SRS, PRACH, etc.) of the terminal to the terminal based on the measurement information of the beam quality received from the terminal.

Multiple beams may be formed by a plurality of TRPs and/or panels. Hereinafter, a TRP and a panel may be collectively referred to as 'TRP'. TRPs may be disposed based on different spatial locations, antenna shapes, boresights, and the like. Accordingly, different beams (e.g., transmission beams, reception beams, transmission/reception beam pairs) may be formed in respective channels formed between the TRPs and the terminal. The base station may perform multi-beam transmission using multiple TRPs, and transmission reliability may be improved by a beam selection gain or a beam diversity gain. The multiple TRP (multi-TRP) transmission scheme may be referred to as 'coordinated multipoint (CoMP)'. TRPs participating in the multi-TRP transmission may belong to the same base station or the same serving cell. Alternatively, TRPs participating in the multi-TRP transmission may belong to different base stations or different serving cells. As a backhaul environment between TRPs, an ideal backhaul and a non-ideal backhaul may be considered. Joint scheduling may be difficult to apply between TRPs connected by the non-ideal backhaul.

[PDCCH Transmission Method Based on Multiple TRPs]

Hereinafter, multi-TRP transmission methods for enhancing PDCCH transmission reliability will be described. In exemplary embodiments, unless otherwise stated, 'beam' may refer to 'transmission beam', 'reception beam', and/or 'transmission/reception beam pair'. In addition, the meaning of 'beam', 'transmission beam', 'reception beam', 'transmission/reception beam pair', and the like may be used interchangeably. In exemplary embodiments, the base station may transmit a PDCCH using a plurality of TRPs, and the terminal may properly receive the PDCCH. Specifically, the base station and the terminal may perform multi-beam based PDCCH transmission based on the following scenarios.

According to a first scenario, DCI may be transmitted through one CORESET and one PDCCH. A plurality of TRPs may transmit DCI to the terminal in the same resource (e.g., the same CORESET, the same search space set, and the same PDCCH candidate) on one PDCCH. For example, one PDCCH that the terminal receives in one CORESET may be transmitted from a plurality of TRPs. This operation may correspond to a transmission scheme such as non-coherent joint transmission (JT) and single frequency network (SFN).

Figure 3:
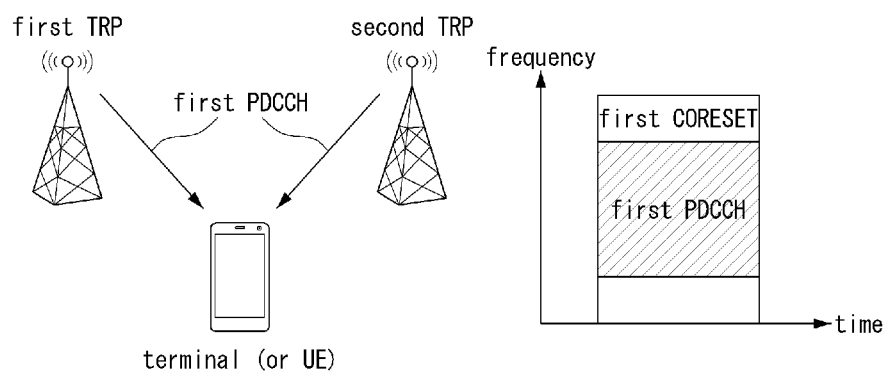
FIG. 3 is a conceptual diagram illustrating a first exemplary embodiment of a PDCCH transmission method according to a first scenario.

FIG. 3 is a conceptual diagram illustrating a first exemplary embodiment of a PDCCH transmission method according to a first scenario.

Referring to FIG. 3, the terminal may obtain DCI by receiving a first PDCCH from first and second TRPs. The first PDCCH may be transmitted through a first CORESET (or, search space set, PDCCH monitoring occasion, etc. corresponding to the first CORESET) configured in the terminal. The terminal may receive the first PDCCH based on a QCL assumption for the first CORESET. The QCL may include a spatial QCL. That is, the terminal may receive a PDCCH transmitted from a plurality of TRPs by using one reception beam. When beams formed by the first and second TRPs are different from each other, PDCCH decoding performance may be improved due to a beam diversity effect. A sufficient condition for the operation based on the first scenario may be that transmission beams or a transmission/reception beam pairs formed by the first and second TRPs should correspond to one reception beam of the terminal.

According to a second scenario, DCI may be transmitted through a plurality of PDCCHs and/or a plurality of CORESETs. A plurality of TRPs may transmit DCI to the terminal in independent (or separate) resources (e.g., different CORESETs, different search space sets, or different PDCCH candidates) on different PDCCHs. The independent resources may overlap in the time domain and/or the frequency domain. The terminal may receive a plurality of PDCCHs in a plurality of CORESETs, and may obtain the same DCI through the plurality of received PDCCHs. Here, the expression that the DCIs transmitted through the plurality of PDCCHs are the same may mean that DCI payloads before being encoded are the same, and a series of processes such as channel coding and resource mapping may be applied identically or differently for each TRP. Strictly speaking, the terminal may obtain a plurality of DCIs through the plurality of PDCCHs, and the plurality of DCIs may have the same payload. The above-described method may be referred to as 'repetitive PDCCH transmission' or 'repetitive DCI transmission'.

In an exemplary embodiment, DCI may refer to each copy of DCI that is repeatedly transmitted, or may refer to a DCI payload, depending on a case. DCI may correspond to one or more downlink or uplink HARQ processes, and may schedule one or more TB(s). The number of TBs scheduled by DCI may be determined by the number of multiple input multiple output (MIMO) transmission layers. For example, the number of TBs may be one when the number of transmission layers is less than or equal to a reference value, and the number of TBs may be two when the number of transmission layers exceeds the reference value. In an exemplary embodiment, for convenience of description, up to two TRPs and CORESETs used for transmitting one DCI may be considered. However, the proposed methods may be easily extended to cases where the number of TRPs and CORESETs is 3 or more.

Figure 4:
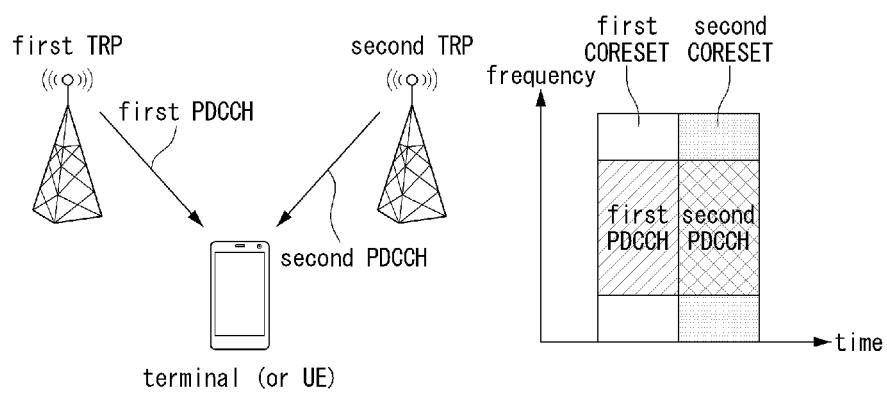
FIG. 4 is a conceptual diagram illustrating a first exemplary embodiment of a PDCCH transmission method according to second and third scenarios.

FIG. 4 is a conceptual diagram illustrating a first exemplary embodiment of a PDCCH transmission method according to second and third scenarios.

Referring to FIG. 4, the terminal may receive a first PDCCH from a first TRP and a second PDCCH from a second TRP. The first PDCCH may be transmitted through a first CORESET (or search space sets, PDCCH monitoring occasions, etc. corresponding to the first CORESET) configured in the terminal. The second PDCCH may be transmitted through a second CORESET (or search space sets, PDCCH monitoring occasions, etc. corresponding to the second CORESET) configured in the terminal. According to the second scenario, the first and second PDCCHs may include the same DCI (or the same DCI payload). The terminal may receive the first PDCCH based on a QCL assumption for the first CORESET, and may receive the second PDCCH based on a QCL assumption for the second CORESET. The QCL may include a spatial QCL (e.g., QCL type D).

When the first and second CORESETs are arranged in different time resources, the terminal may apply reception beamforming for each CORESET regardless of whether the spatial QCL assumptions of the first and second CORESETs are the same, and may perform PDCCH monitoring on each CORESET. On the other hand, when the first and second CORESETs overlap in time and have different spatial QCL assumptions, the terminal may monitor only one CORESET by applying a priority between the CORESETs according to a radio frequency (RF) capability of the terminal.

The terminal may successfully receive both the first and second PDCCHs according to a PDCCH blind decoding result. In this case, the terminal may perform a soft combining operation on a plurality of DCIs. Therefore, DCI decoding performance may be improved. Alternatively, the terminal may successfully receive only one PDCCH among the first and second PDCCHs. When the first PDCCH is successfully received or when the second PDCCH is successfully received, the terminal may successfully obtain DCI from the received PDCCH, and the PDCCH decoding performance may be improved by a beam diversity effect.

According to the third scenario, DCIs may be transmitted through a plurality of (e.g., two) CORESETs and a plurality of (e.g., two) PDCCHs. Each of the plurality of TRPs may transmit DCI to the terminal through an independent resource (e.g., different CORESET, different search space set, and different PDCCH candidate) on a different PDCCH. The DCIs (e.g., DCI payloads) transmitted from the TRPs may usually be different. Alternatively, the DCIs (e.g., DCI payloads) transmitted from the TRPs may be the same. The DCIs transmitted from the TRPs may schedule the same downlink TB(s), the same uplink TB(s), or the same HARQ process. In the exemplary embodiment of FIG. 4, according to the third scenario, the DCIs transmitted on the first and second PDCCHs may generally be different from each other. The DCIs transmitted on the first and second PDCCHs may include scheduling and resource allocation information for the same TB(s). In this case, strictly speaking, the first and second PDCCHs may be regarded as different PDCCHs, and transmission reliability of the PDCCH itself may be difficult to be improved. However, at least the transmission reliability of the TB(s) or data channels (e.g., PDSCH, PUSCH) scheduled by the PDCCHs may be improved.

Hereinafter, exemplary embodiments of a PDCCH transmission method (e.g., repetitive PDCCH transmission method) according to the second scenario will be described. However, some exemplary embodiments may correspond to the third scenario or a scenario in the second and third scenarios are combined. In exemplary embodiments, scheduling of a downlink TB(s) will be mainly considered, but exemplary embodiments may be performed in the same or similar manner for scheduling of an uplink TB(s).

[Data Channel Scheduling Method]

A PDSCH may be mapped to temporally consecutive symbol(s). Accordingly, time domain resource assignment information of a PDSCH may include information on a start symbol (or index of the start symbol) of the PDSCH and a duration of the PDSCH (e.g., number of symbol(s) constituting the PDSCH). The information on the start symbol of the PDSCH (hereinafter referred to as 'S') and the information on the length of the PDSCH (hereinafter referred to as 'L') may be expressed as a start and length indicator value (SLIV). The base station may indicate or configure the SLIV to the terminal. One SLIV value may correspond to one (S, L) pair. Alternatively, each of S and L may be defined as a separate parameter, and the base station may indicate or configure each of S and L to the terminal.

A method for the terminal to interpret the start symbol of the PDSCH (e.g., value of S) may include at least two of the following. A first method may be a method in which the value of S is interpreted as an index (e.g., one value from 0 to 13 in a normal CP case of the NR communication system) of the start symbol of the PDSCH within a slot. In other words, the value of S may be regarded as a symbol distance or symbol offset between the start symbol of the PDSCH and a slot boundary (e.g., a first symbol of a slot in which the PDSCH is allocated or a start time of the first symbol). For example, when (S=3) is indicated to the terminal, the terminal may regard the start symbol of the PDSCH as the fourth symbol (e.g., symbol having an index of 3) of the corresponding slot. A second method may be a method in which the value of S is interpreted as a symbol distance or symbol offset between the start symbol of the PDSCH and one symbol (e.g., a first symbol of a PDCCH) through which the PDCCH is transmitted. The PDCCH may be a PDCCH for scheduling the PDSCH. For example, when (S=3) is indicated to the terminal, the terminal may regard that the start symbol of the PDSCH is 3 symbols later than the start symbol of the PDCCH. That is, when the start symbol of the PDCCH is the X-th symbol of the slot, the terminal may regard that the PDSCH is mapped from the (X+3)-th symbol of the slot.

Meanwhile, in the second and third scenarios, a plurality of PDCCHs may schedule the same PDSCH. This may be referred to as (Method 100). Alternatively, a plurality of PDCCHs may generally schedule different PDSCHs. This may be referred to as (Method 110). (Method 100) may be implemented by the first method described above. (Method 110) may be implemented by the first method or the second method described above.

Figure 5A:
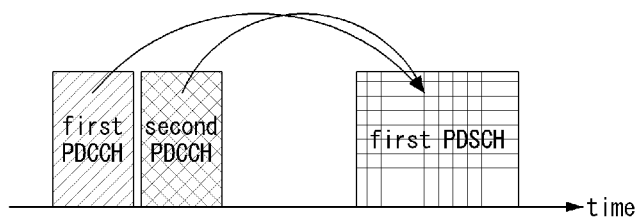
FIG. 5A is a conceptual diagram illustrating a first exemplary embodiment of a PDSCH scheduling method using multiple PDCCHs.
Figure 5B:
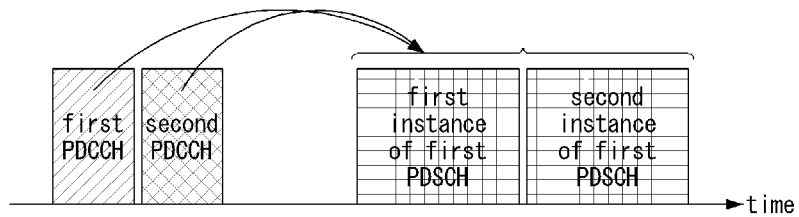
FIG. 5B is a conceptual diagram illustrating a second exemplary embodiment of a PDSCH scheduling method using multiple PDCCHs.

FIG. 5A is a conceptual diagram illustrating a first exemplary embodiment of a PDSCH scheduling method using multiple PDCCHs, and FIG. 5B is a conceptual diagram illustrating a second exemplary embodiment of a PDSCH scheduling method using multiple PDCCHs. The exemplary embodiments shown in FIGS. 5A and 5B may be implemented by (Method 100).

Referring to FIGS. 5A and 5B, a plurality of PDCCHs (e.g., first and second PDCCHs) may schedule the same PDSCH (e.g., first PDSCH). In the exemplary embodiment shown in FIG. 5B, the PDSCH (e.g., first PDSCH) scheduled by the plurality of PDCCHs (e.g., first and second PDCCHs) may be repeatedly transmitted. Each PDSCH repeatedly transmitted may be referred to as a PDSCH instance (e.g., first and second PDSCH instances).

In the exemplary embodiments of FIGS. 5A and 5B, a start symbol of the PDSCH may be indicated based on a slot boundary (e.g., a start time or a start symbol of a slot in which the PDSCH is allocated) by the first method. The terminal may obtain S through DCI, may regard that the value of S is a symbol index within the slot, and may determine a symbol corresponding to S as the start symbol of the PDSCH. Therefore, when a plurality of PDCCHs are transmitted in the same slot, the same PDSCH may be scheduled by the plurality of PDCCHs regardless of positions of time resources through which the plurality of PDCCHs are transmitted. When a plurality of PDCCHs are transmitted in different slots, each PDCCH may schedule a different PDSCH. Different PDSCHs may be allocated in different slots. This may correspond to (Method 110). Alternatively, when a plurality of PDCCHs are transmitted in different slots, the plurality of PDCCHs may schedule the same PDSCH (or the same PDSCHs, the same PDSCH instance(s) constituting repetitive transmission). In this case, a time resource of the PDSCH (e.g., a slot in which the PDSCH is transmitted, a start symbol of the PDSCH, etc.) may be determined based on a relative distance with a resource in which one PDCCH among the plurality of PDCCHs is transmitted (e.g., slot and/or symbol in which a search space set, CORESET, or PDCCH monitoring occasion through which the one PDCCH is transmitted is arranged). The one PDCCH may be the latest PDCCH among the plurality of PDCCHs (e.g., a PDCCH transmitted in the latest slot or a PDCCH having the latest end symbol).

Alternatively, in the exemplary embodiments of FIGS. 5A and 5B, the start symbol of the PDSCH may be interpreted as a relative symbol distance with a symbol (e.g., the first symbol of the PDCCH) through which the PDCCH is transmitted by the second method. In this case, when a plurality of PDCCHs are transmitted in different symbol(s) (e.g., when start symbols of the plurality of PDCCHs are different), the time resource of the PDSCH (e.g., the start symbol of the PDSCH, the slot in which the PDSCH is transmitted, etc.) may be determined based on a relative distance with a symbol (e.g., a start symbol of one PDCCH) in which one PDCCH among the plurality of PDCCHs is transmitted. The one PDCCH may be a PDCCH having a later (or earlier) end symbol among the plurality of PDCCHs. Alternatively, the one PDCCH may be a PDCCH having an earlier (or later) start symbol among the plurality of PDCCHs. More detailed information on this will be described later.

Figure 6A:
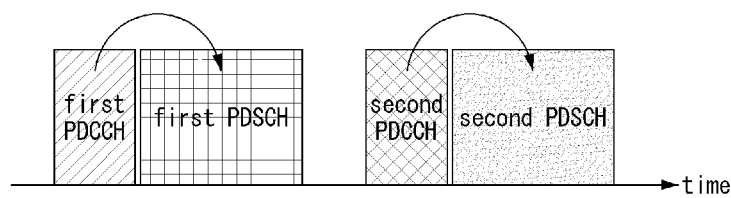
FIG. 6A is a conceptual diagram illustrating a third exemplary embodiment of a PDSCH scheduling method using multiple PDCCHs.
Figure 6B:
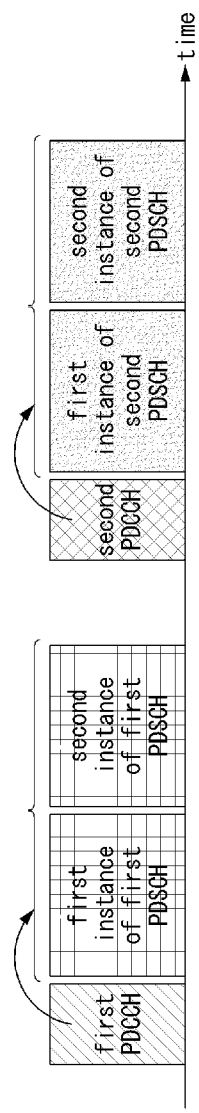
FIG. 6B is a conceptual diagram illustrating a fourth exemplary embodiment of a PDSCH scheduling method using multiple PDCCHs.

FIG. 6A is a conceptual diagram illustrating a third exemplary embodiment of a PDSCH scheduling method using multiple PDCCHs, and FIG. 6B is a conceptual diagram illustrating a fourth exemplary embodiment of a PDSCH scheduling method using multiple PDCCHs. The exemplary embodiments of FIGS. 6A and 6B may be implemented by (Method 110).

Referring to FIGS. 6A and 6B, each of a plurality of PDCCHs may schedule a different PDSCH. For example, a first PDCCH may schedule a first PDSCH, and a second PDCCH may schedule a second PDSCH. In the exemplary embodiment of FIG. 6B, each PDSCH (e.g., first and second PDSCH) may be repeatedly transmitted.

In the exemplary embodiments of FIGS. 6A and 6B, a start symbol of the PDSCH may be indicated based on one symbol (e.g., a first symbol of a PDCCH) through which the PDCCH is transmitted by the second method. The PDCCH may be a PDCCH (e.g., scheduling PDCCH, scheduling DCI) for scheduling the PDSCH. The terminal may obtain S through DCI, and may apply S to each PDCCH to identify a start symbol of a PDSCH corresponding to each PDCCH. For example, the terminal may obtain information indicating (S=2) through the DCI received through the first and second PDCCHs. Based on S=2, the terminal may regard that each of the first and second PDSCHs is mapped from a symbol that is two symbols later from each start symbol of the first and second PDCCHs. In this case, when the start symbol of the first PDCCH is different from the start symbol of the second PDCCH, the first and second PDSCHs may be transmitted through different time resources. That is, the first and second PDSCHs may be different from each other. In this case, the first and second PDCCHs may be transmitted in the same slot or in different slots. On the other hand, when the start symbol of the first PDCCH is the same as the start symbol of the second PDCCH, and when the first and second PDCCHs are transmitted in the same slot, the first and second PDSCHs may be transmitted through the same time resource or through the same time resource and the same frequency resource. That is, the first and second PDSCHs may be the same. In summary, according to (Method 110), the base station may schedule the same PDSCH or different PDSCHs through a plurality of PDCCHs by appropriately determining the positions of the start symbols of the plurality of PDCCHs.

Alternatively, in the exemplary embodiments of FIGS. 6A and 6B, the start symbol of the PDSCH may be indicated by the first method. For example, a plurality of PDCCHs (e.g., first and second PDCCHs) may be transmitted in different slots. In this case, the first and second PDCCHs may include the same DCI (or DCI payload), and slot offsets (e.g., slot distance between the slot in which the PDCCH is transmitted and the slot in which the PDSCH is transmitted) of the first and second PDSCHs indicated by the first and second PDCCHs may be the same. Accordingly, the first and second PDSCHs may be transmitted in different slots.

In the above-described exemplary embodiments, the first and second PDCCHs (or first and second PDCCH candidates, first and second search space sets corresponding to the first and second PDCCHs) may belong to different CORESETs. For example, when (Method 110) is used, repeatedly-transmitted PDCCHs may belong to different CORESETs, and the different CORESETs may belong to different CORESET pools. That is, the different CORESETs may be included in the CORESET pools having different CORESET pool IDs, respectively. Each CORESET pool may correspond to each TRP (or, each cell, each radio unit (RU), etc.), and the terminal may assume a different (or independent) spatial QCL, TCI state, etc. for each CORESET pool. According to the above-described method, the PDCCH and the PDSCH may be transmitted from a plurality of TRPs (or, a plurality of cells, a plurality of RUs, etc.), and the PDCCH and PDSCH reception performance of the terminal may be improved.

In exemplary embodiments, cross-carrier scheduling may be used. That is, a plurality of serving cells may be configured to the terminal, and a cell (i.e., scheduling cell) in which PDCCHs are transmitted may be different from a cell (i.e., scheduled cell) in which a PDSCH scheduled by the PDCCHs is transmitted. In this case, a plurality of PDCCHs transmitted from a plurality of TRPs may be transmitted in the same cell. Alternatively, each of a plurality of PDCCHs transmitted from a plurality of TRPs may be transmitted in a different cell. For example, a plurality of scheduling cells (e.g., PCell/PSCell and SCell) may correspond to one scheduled cell (e.g., PCell/PSCell), and a plurality of PDCCHs may be transmitted by each of the plurality of scheduling cells.

[PDCCH Reception Procedure]

The terminal may receive a PDCCH according to a procedure to be described below. The PDCCH reception procedure of the terminal may include first, second, and third steps. The PDCCH reception procedure of the terminal may correspond to a PDCCH transmission procedure of the base station. Up to two PDCCHs and DCIs may be considered for one scheduling.

The first step of the PDCCH reception procedure may be a step in which the terminal performs a PDCCH decoding operation. The terminal may determine PDCCH candidate(s) to be monitored based on configuration information of a CORESET, search space set, etc. received from the base station and/or a predefined PDCCH mapping rule, and perform blind-decoding on the corresponding PDCCH candidate(s).

The second step may be a step in which the terminal checks whether or not a PDCCH is repeatedly transmitted. The terminal may check whether two DCIs successfully received are DCIs repeatedly transmitted according to a predetermined criterion. This operation may be performed in the second scenario. Alternatively, the terminal may check whether two DCIs successfully received are DCIs scheduling the same TB(s) according to a predetermined criterion. This operation may be performed in the third scenario. For example, when simultaneously satisfying one or more conditions among a condition that two DCIs successfully received are transmitted in the same slot, a condition that CRCs of two DCIs successfully received are scrambled with the same RNTI, and a condition that two DCIs successfully received are transmitted in the same PDCCH monitoring resource pool, the terminal may determine that the two DCIs are repeatedly transmitted DCIs or that the two DCIs are DCIs scheduling the same TB(s). The above-described conditions may correspond to sufficient conditions for determining that the two DCIs are DCIs repeatedly transmitted or DCIs scheduling the same TB(s). In addition to or separately from the above-described conditions, when two DCIs successfully received are respectively received in PDCCH candidates associated with each other (or search space sets associated with each other), the terminal may determine that the two DCIs are DCIs repeatedly transmitted or DCIs scheduling the same TB(s). Details on association between a PDCCH monitoring resource pool and PDCCH candidates will be described later.

In addition to or separately from the above-described operation, when two DCIs successfully received have the same payload, the terminal may determine that the two DCIs are DCIs repeatedly transmitted. Alternatively, when at least part of payloads of two DCIs successfully received are the same, the terminal may determine that the two DCIs are DCIs scheduling the same TB(s). At least part of the payloads may include field(s) used for PDSCH reception and/or HARQ operation of the terminal (e.g., HARQ process ID, time domain resource assignment, frequency domain resource assignment, number of TBs, MCS, redundancy version (RV), new data indicator (NDI), TCI, downlink assignment index (DAI), DM-RS related field, code block group (CBG) related field, etc.). Alternatively, the terminal may obtain information indicating whether two DCIs successfully received are DCIs repeatedly transmitted or DCIs scheduling the same TB(s) through an explicit method from the base station. For example, the terminal may determine whether two DCIs successfully received are DCIs repeatedly transmitted or DCIs scheduling the same TB(s) based on specific field value(s) of the two DCIs. The specific field(s) may be a field indicating whether the DCI is repeatedly transmitted, a field indicating the number of DCI(s) repeatedly transmitted or scheduling the same TB(s), a DCI transmission counter field (e.g., a field indicating an order of the transmitted DCI among copies of the repetitive transmission), etc.

The third step may be a step in which the terminal processes the DCI. When it is determined in the second step that the two DCIs are DCIs repeatedly transmitted or DCIs scheduling the same TB(s), the terminal may perform a PDSCH reception operation and/or HARQ operation by using only one DCI of the two DCIs. The one DCI may be arbitrarily determined by the terminal. Alternatively, the one DCI may be determined by a predetermined rule. For example, the terminal may select the one DCI based on times at which the two DCIs are received, CORESET index, search space set index, search space set type, etc., and may perform an operation of receiving a PDSCH and/or an HARQ-ACK (acknowledgement) transmission operation corresponding to the PDSCH based on the selected DCI. The terminal may ignore another DCI that is not selected or may omit processing of at least part of a payload thereof. Alternatively, the terminal may use both DCIs to receive the PDSCH.

Meanwhile, the DCIs may include fields (e.g., PUCCH power control, PUCCH resource indication, SRS request, carrier indicator field (CIF), bandwidth part indicator, etc.) irrelevant to the PDSCH reception operation and HARQ operation of the terminal. In a certain case (e.g., the third scenario), fields (e.g., field values, field sizes, etc.) of DCIs received through a plurality of PDCCHs may be different from each other. In this case, the terminal may perform a corresponding operation using all of the corresponding field values of the two DCIs. For example, the terminal may perform all of the PUCCH power control operations corresponding to the two DCIs. Alternatively, the terminal may perform a corresponding operation using a corresponding field value of one of the two DCIs. For example, the terminal may determine a PUCCH transmission resource based on PUCCH resource indication information of one DCI. For another example, the terminal may transmit an SRS based on SRS request information of one DCI. However, according to the above-described method, it may be difficult for the base station to know which PDCCH(s) the terminal has successfully received. Therefore, it may be difficult for the base station to predict the operation of the terminal according to the DCI. In order to solve the above-described problem, the base station may determine the field(s) irrelevant to the PDSCH reception operation and the HARQ operation of the terminal to be the same values for the plurality of DCIs, and may transmit the DCIs including the corresponding values. That is, the terminal may expect that the field(s) of the plurality of DCIs, that are irrelevant to the PDSCH reception operation and the HARQ operation, have the same values.

Even when the terminal receives both the DCIs, the terminal may perform operations related to the fields only once using only one DCI.

Some of the steps of the above-described PDCCH reception procedure may be performed in a modified form or may be omitted. In addition, the PDCCH reception procedure may further include other steps in addition to the steps described above.

A PDCCH monitoring resource pool may refer to a resource region and/or a set of PDCCH candidate(s) in which the terminal may expect to receive repeatedly transmitted PDCCHs. For example, the terminal may check whether a plurality of (e.g., two) PDCCHs or DCIs received in the same PDCCH monitoring resource pool are DCIs repeatedly transmitted or DCIs scheduling the same TB(s).

The PDCCH monitoring resource pool may be composed of one or more CORESET(s) (or PDCCH candidate(s) belonging to one or more CORESET(s)), one or more search space set(s) (or PDCCH candidate(s) belonging to the one or more search space set(s)), or the like. For example, the terminal may receive information indicating to configure a specific CORESET(s) (or PDCCH candidate(s) belonging to the specific CORESET(s)) as a PDCCH monitoring resource pool from the base station. Alternatively, the terminal may receive information indicating to configure a specific search space set(s) (or PDCCH candidate(s) belonging to the specific search space set(s)) as a PDCCH monitoring resource pool from the base station. The above-described configuration operation (e.g., configuration operation of a PDCCH monitoring resource pool) may be performed by an RRC signaling procedure. The specific CORESET(s) may include the CORESET #0. The specific search space set(s) may include only a USS set. That is, multi-TRP-based PDCCH transmission may be performed only for transmission of DCI for scheduling unicast and/or groupcast transmission. Alternatively, the specific search space set may include both a USS set and a CSS set without distinction. The specific search space set may include a search space set configured to monitor a specific DCI format (e.g., DCI format 1_1, 1_2) and/or a specific RNTI (e.g., C-RNTI, MCS-C-RNTI, CS-RNTI). In this case, a plurality of search space sets or a plurality of CORESETs may be configured as a PDCCH monitoring resource pool, and the plurality of search space sets or the plurality of CORESETs may be linked (or associated) with each other. In addition, a plurality of PDCCH candidates belonging to the plurality of search space sets or the plurality of CORESETs may be linked (or associated) with each other. The terminal may monitor PDCCHs repeatedly transmitted in the search space sets or CORESETs associated with each other. Details on the association of the PDCCH candidates will be described later.

Alternatively, a PDCCH monitoring resource pool may be a predefined set of resources or a predefined set of PDCCH candidate(s). For example, a PDCCH monitoring resource pool may include all CORESET(s) configured in the terminal (or PDCCH candidate(s) belonging thereto). Alternatively, a PDCCH monitoring resource pool may include the remaining CORESET(s) excluding a specific CORESET (e.g., CORESET #0) among the CORESET(s) configured in the terminal. Alternatively, a PDCCH monitoring resource pool may include all USS set(s) belonging to CORESET(s).

In an exemplary embodiment, each PDCCH monitoring resource pool may include M PDCCH candidates. Here, M may refer to the maximum number of repeated transmissions of a PDCCH. M may be a natural number. For example, when M=2, the terminal may perform blind decoding on each pair of PDCCH candidates. When two PDCCHs are successfully received, the terminal may regard that the two PDCCHs are PDCCHs repeatedly transmitted or PDCCHs scheduling the same TB(s), and may perform a PDCCH reception procedure. Accordingly, the terminal may perform a soft combining operation for repeatedly transmitted DCIs with low complexity.

In addition to or separately from the above-described operation, a PDCCH monitoring resource pool may occupy a predetermined time period. Alternatively, a PDCCH monitoring resource pool may belong to a predetermined time period. For example, the terminal may check whether a plurality of (e.g., two) PDCCHs or DCIs received within a predetermined time period are PDCCHs or DCIs repeatedly transmitted or PDCCHs or DCIs scheduling the same TB(s). The predetermined time period may be referred to as a PDCCH monitoring window. The PDCCH monitoring window may be configured in a time unit of the above-described frame structure. For example, the PDCCH monitoring window may be configured based on one or a combination of two or more among one or more slot(s), one or more subslot(s), and one or more monitoring span(s). Here, the span may be composed of consecutive symbol(s), and zero, one, or a plurality of span(s) may be arranged within one slot. For example, a PDCCH monitoring window may be one slot. That is, the PDCCH monitoring resource pool may occupy one slot. In this case, the terminal may identify whether the PDCCH is repeatedly transmitted in each slot by the above-described method, and may perform a PDCCH reception procedure based on the identified result.

Alternatively, a PDCCH monitoring window (or PDCCH monitoring resource pool) may be determined based on a transmission timing of a specific signal. For example, a PDCCH monitoring window may be determined as a predetermined time period starting from a time at which DCI is received (i.e., one symbol (e.g., the first symbol, the last symbol) of a PDCCH). In addition to or separately from the above-described operation, a PDCCH monitoring window may be a predetermined time period prior to an HARQ feedback transmission time (i.e., one symbol (e.g., the first symbol) of a PUCCH or PUSCH). The predetermined time period may have a length based on one or a combination of two or more among consecutive symbol(s), slot(s), subslot(s), and monitoring span(s). In this case, the PDCCH monitoring window may be applied to each transmission serving as a reference time. For example, the terminal may configure a PDCCH monitoring window for each of the DCIs successfully received, and may check whether repeatedly-transmitted DCI is received or not for each of the DCIs successfully received within the PDCCH monitoring window.

[Linking of Search Space Sets]

According to the above-described method, in case of multi-TRP-based repetitive PDCCH transmission, PDCCH candidates through which PDCCHs constituting repetitive transmission are transmitted may be associated (or linked) with each other. In addition, search space sets corresponding to the PDCCH candidates may be associated (or linked) with each other. This operation will be described in exemplary embodiments.

Figure 7:
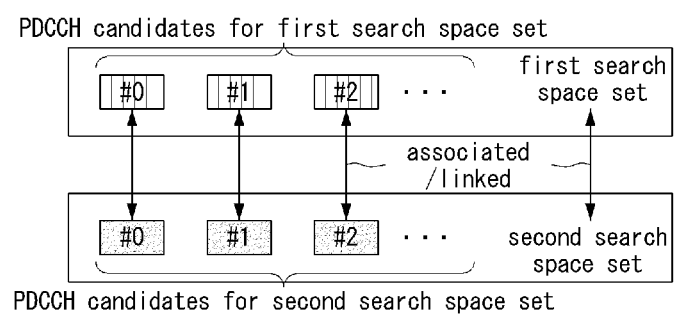
FIG. 7 is a conceptual diagram illustrating a first exemplary embodiment of a PDCCH search space set linking method for PDCCH repetitive transmission.

FIG. 7 is a conceptual diagram illustrating a first exemplary embodiment of a PDCCH search space set linking method for PDCCH repetitive transmission.

Referring to FIG. 7, the terminal may receive configuration information of first and second search space sets (e.g., first and second SS sets) from the base station. The first search space (e.g., the first search space set) may be associated with a first CORESET, and the second search space (e.g., the second search space set) may be associated with a second CORESET. TCI states and/or QCLs of the first and second CORESETs may be individually configured or determined. For example, PDCCH transmissions in the first and second CORESETs may be performed from different TRPs, and the TCI states and/or QCL sources of the first and second CORESETs may be different from each other. Alternatively, the first and second CORESETs may be identical. For example, the first and second CORESETs may have the same CORESET ID. In this case, the repeatedly-transmitted PDCCHs may be monitored or received based on the same TCI state and/or QCL source.

In this case, the first and second search space sets may be associated with each other. In the search space sets associated with each other, a PDCCH may be repeatedly transmitted. For example, for scheduling of a PDSCH or PUSCH, a PDCCH may be repeatedly transmitted, and the repeatedly-transmitted PDCCHs may include first and second PDCCHs. In this case, the first PDCCH may be transmitted in the first search space set, and the second PDCCH may be transmitted in the second search space set. In addition, PDCCH candidate(s) belonging to the first search space set and PDCCH candidate(s) belonging to the second search space set may be associated with each other. In the exemplary embodiment of FIG. 7, a PDCCH candidate #0 (or PDCCH candidate having an index of 0) belonging to the first search space set may be associated with a PDCCH candidate #0 (or PDCCH candidate having an index of 0) belonging to the second search space set, and a PDCCH candidate #1 (or PDCCH candidate having an index of 1) belonging to the first search space set may be associated with a PDCCH candidate #1 (or PDCCH candidate having an index of 1) belonging to the second search space set. In the PDCCH candidates associated with each other, the PDCCH may be repeatedly transmitted. For example, the first PDCCH may be transmitted in the PDCCH candidate #0 of the first search space set, and the second PDCCH may be transmitted in the PDCCH candidate #0 of the second search space set. Alternatively, the first PDCCH may be transmitted in the PDCCH candidate #1 of the first search space set, and the second PDCCH may be transmitted in the PDCCH candidate #1 of the second search space set. The terminal may receive information on the association (or linking) of the search space sets or PDCCH candidates through signaling (e.g., RRC signaling, MAC CE signaling, and/or DCI signaling) from the base station.

The association relationship of PDCCH candidates in the associated search space sets may be determined based on index(es) of the PDCCH candidates. For example, as in the above-described exemplary embodiment, PDCCH candidates having the same index between the first and second search space sets may be associated with each other. In addition, the association relationship of the PDCCH candidates between the associated search space sets may be determined based on aggregation levels thereof. For example, PDCCH candidates having the same aggregation level between the first and second search space sets may be associated with each other. Alternatively, PDCCH candidates having the same aggregation level and the same PDCCH candidate index between the first and second search space sets may be associated with each other. When a PDCCH candidate having a specific aggregation level and/or a specific PDCCH candidate index exist in only one search space set among the first and second search space sets associated with each other, the corresponding PDCCH candidate may not be associated with another PDCCH candidate, and the corresponding PDCCH candidate may not be used for repetitive PDCCH transmission.

[Configuration of Associated Search Space Sets]

Search space sets associated with each other (or monitoring occasions corresponding to the search space sets associated with each other) may be configured to have the same monitoring periodicity. Also, the search space sets associated with each other (or monitoring occasions corresponding to the search space sets associated with each other) may be arranged in the same slot. For example, slot offsets of the search space sets may be configured to be the same value. Alternatively, as a method for increasing a degree of freedom for scheduling, the search space sets associated with each other may be allowed to be arranged in different slots. In consideration of the number of TRPs participating in multi-TRP transmission, a maximum of X search space sets may be associated with each other. X may be a natural number greater than 1. For example, X may be 2. Also, the search space sets associated with each other may be configured as the same search space set type. For example, the search space sets associated with each other may be the USS sets. For another example, the search space sets associated with each other may be the CSS sets.

The same aggregation level(s) may be configured to the search space sets associated with each other, and the same number of PDCCH candidate(s) may be configured for each aggregation level. In this case, the search space sets may include the same number of PDCCH candidate(s), and PDCCH candidates may correspond one-to-one between the search space sets.

Figure 8A:
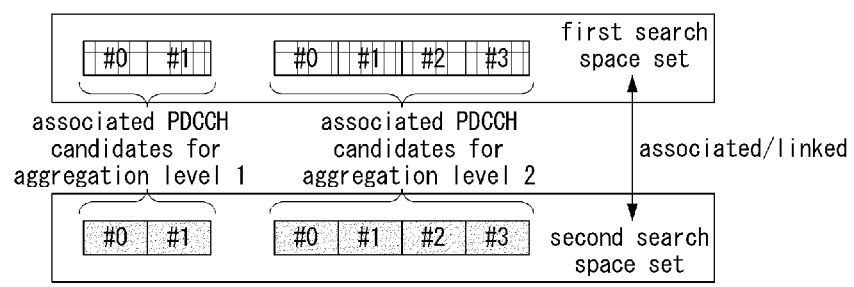
FIG. 8A is a conceptual diagram illustrating a second exemplary embodiment of a PDCCH search space set linking method for repetitive PDCCH transmission.

FIG. 8A is a conceptual diagram illustrating a second exemplary embodiment of a PDCCH search space set linking method for repetitive PDCCH transmission.

Referring to FIG. 8A, first and second search space sets may be associated with each other for repetitive PDCCH transmission, and may be configured with the same aggregation level(s) and the same number of PDCCH candidates. For example, each of the first and second search space sets may include PDCCH candidates #0 and #1 (i.e., PDCCH candidates having indexes 0 and 1) for the aggregation level 1 and PDCCH candidates #0 to #3 (i.e., PDCCH candidates having indexes of 0 to 3) for the aggregation level 2. The PDCCH candidates of the first search space set and the PDCCH candidates of the second search space set may be associated by the method described above. For example, PDCCH candidates having the same aggregation level and the same PDCCH candidate index (or number) between the first and second search space sets may be associated with each other.

Alternatively, the aggregation level(s) configured for each search space set and/or the number of PDCCH candidates for each aggregation level may not necessarily match each other. For example, some PDCCH candidate(s) within a certain search space set may be associated with PDCCH candidate(s) of another search space set, and may be used for repetitive PDCCH transmission. In addition, some other PDCCH candidate(s) may be used for single PDCCH transmission without being associated with PDCCH candidate(s) of another search space set. The base station may perform both repetitive PDCCH transmission and single PDCCH transmission using one search space set. That is, dynamic switching may be performed between the repetitive PDCCH transmission and the single PDCCH transmission.

Figure 8B:
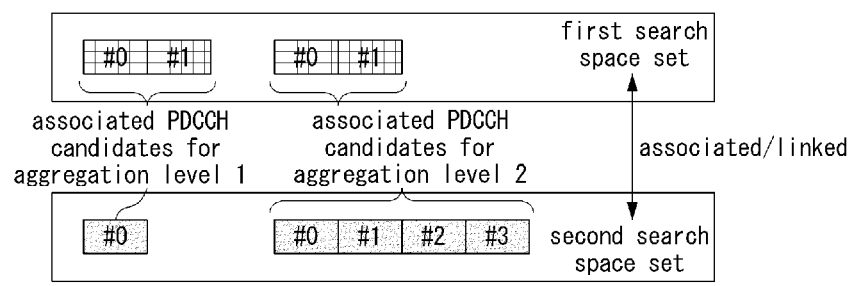
FIG. 8B is a conceptual diagram illustrating a third exemplary embodiment of a PDCCH search space set linking method for repetitive PDCCH transmission.

FIG. 8B is a conceptual diagram illustrating a third exemplary embodiment of a PDCCH search space set linking method for repetitive PDCCH transmission.

Referring to FIG. 8B, first and second search space sets may be associated with each other for repetitive PDCCH transmission, and may be configured with different numbers of PDCCH candidates. For example, the first search space set may include two PDCCH candidates for the aggregation level 1 and two PDCCH candidates for the aggregation level 2. That is, the first search space set may include four PDCCH candidates. The second search space set may include one PDCCH candidate for the aggregation level 1 and four PDCCH candidates for the aggregation level 2. That is, the second search space set may include five PDCCH candidates. The PDCCH candidates of the first search space set and the PDCCH candidates of the second search space set may be associated by the method described above. For example, PDCCH candidates having the same aggregation level and the same PDCCH candidate index (or number) between the first and second search space sets may be associated with each other. According to the above-described rule, some PDCCH candidates (e.g., PDCCH candidate #1 (or, PDCCH candidate having an index of 1) for the aggregation level 1 in the first search space set and PDCCH candidates #2 and #3 (or, PDCCH candidates having indexes 2 and 3) for the aggregation level 2 in the second search space set may not be associated. The unassociated PDCCH candidate may be used for single PDCCH transmission.

PDCCH mapping rules (e.g., mapping between CCEs and REGs, REG bundling, whether to apply interleaving, DM-RS configuration), beam-related operations (e.g., TCI state), whether cross-carrier scheduling is applied, and the like of the search space sets associated with each other and/or CORESETs corresponding to the search space sets associated with each other may be configured independently of each other (e.g., to be the same or different from each other). On the other hand, a specific configuration parameter may be configured equally between the search space sets associated with each other and/or the CORESETs corresponding to the search space sets associated with each other. For example, whether DCI scheduled from a CORESET includes TCI state information (or QCL information, beam indication information, etc.) of a PDSCH may be configured equally for the CORESETs (e.g., the first and second CORESETs) corresponding to the search space sets associated with each other. The above-described configured may be performed by RRC signaling (e.g., RRC parameter 'TCIPresenceInDCI'). According thereto, the terminal may expect that the TCI state information of the PDSCH is included in all of the repeatedly transmitted DCIs. Alternatively, the terminal may expect that the TCI state information of the PDSCH is not included in all of the repeatedly transmitted DCIs. As a result, the payload (e.g., a set of fields constituting the payload, size of each field, interpretation scheme for each field, etc.) of DCI formats transmitted from the search space sets associated with each other (e.g., the first and second search space sets) corresponding to the first and second CORESETs may be identical, and the terminal may improve the PDCCH decoding performance by performing a soft combining operation on a plurality of received DCIs.

Meanwhile, a CORESET associated with a search space set for repetitive PDCCH transmission may be associated with another search space set (e.g., a search space set not used for repetitive PDCCH transmission). Therefore, in some cases, it may be difficult to equally configure whether to include the TCI state information of the PDSCH in the DCI between the first CORESET and the second CORESET. In this case, when the DCI is configured to include the TCI state information of the PDSCH with respect to at least one CORESET, the terminal may regard that the DCIs transmitted in all the associated search space sets (e.g., first and second search space sets) include the TCI state information of the PDSCH, and may perform a PDCCH and PDSCH reception operation based on the regarded result. The DCIs may include the TCI state information of the same PDSCH. Alternatively, when the DCI is configured not to include the TCI state information of the PDSCH for at least one CORESET, the terminal may regard that the DCIs transmitted in all the associated search space sets (e.g., first and second search space sets) do not include the TCI state information of the PDSCH, and may perform a PDCCH and PDSCH reception operation based on the regarded result. That is, even when it is configured to monitor the DCI that does not include the TCI state information of the PDSCH in a certain search space set (or CORESET corresponding to the search space set), the terminal may regard that at least some DCI (e.g., DCI for repetitive PDCCH transmission, DCI transmitted in an associated PDCCH candidate) of the search space set includes TCI state information. Alternatively, even when it is configured to monitor the DCI including the TCI state information of the PDSCH in a certain search space set (or CORESET corresponding to the search space set), the terminal may regard that at least some DCI (e.g., DCI for repetitive PDCCH transmission, DCI transmitted in an associated PDCCH candidate) of the search space set does not include the TCI state information. In this case, a PDSCH DM-RS may be regarded as being QCLed with a PDCCH DM-RS of a PDCCH for scheduling the PDSCH. Alternatively, the PDSCH DM-RS may be regarded as being QCLed with a certain downlink signal (e.g., a DM-RS, SS/PBCH block, CSI-RS, TRS, etc. of a certain CORESET) according to a predetermined rule.

[Monitoring of Associated PDCCH Candidates]

The maximum number of PDCCH blind decoding (hereinafter referred to as '$N_{BD}$') that the terminal can perform during each reference time (e.g., each slot, each span, and each Z consecutive slots) and the maximum number of CCEs that the terminal can process (hereinafter referred to as '$N_{CCE}$') during each reference time may be configured from the base station to the terminal. Alternatively, $N_{BD}$ and $N_{CCE}$ may be predefined in the technical specification. The terminal may sequentially map search space sets (e.g., PDCCH candidates belonging to the search space sets) configured within the corresponding reference time until the total number of PDCCH candidates for each reference time described above does not exceed $N_{BD}$ and/or until the total number of CCEs does not exceed $N_{CCE}$ for each reference time described above. The terminal may perform a blind decoding operation on a PDCCH candidate belonging to the mapped search space set, and may omit a blind decoding operation on a PDCCH candidate belonging to an unmapped search space set. In this case, a CSS set may be mapped prior to a USS set, and the terminal may not expect that a CSS set is not mapped. That is, all PDCCH candidates belonging to a CSS set may always be monitored by the terminal. Also, the search space sets may be sequentially mapped based on the IDs of the search space sets (e.g., in the order of the lowest IDs of the search space sets). For example, the mapping operation based on the IDs of the search space sets may be performed on USS set(s) after all CSS set(s) are mapped. The above-described method may be performed for each serving cell. When cross-carrier scheduling is used, the above-described method may be applied to scheduling cell(s) (e.g., cell(s) in which scheduling DCI is transmitted).

In this case, both the first search space set and the second search space set associated with each other may be mapped, or none of them may be mapped. That is, the terminal may not expect only one search space set from among the first search space set and the second search space set to be mapped. In this case, the terminal may monitor both the first search space set and the second search space set, or may monitor none of them. That is, the terminal may monitor both the first PDCCH candidate and the second PDCCH candidate associated with each other between the first search space set and the second search space set, or may monitor none of them. This may be referred to as (Method 120). Alternatively, an operation in which both the first search space set and the second search space set associated with each other are mapped, an operation in which none of the first search space set and the second search space set associated with each other is mapped, and an operation in which only one search space set among the first search space set and the second search space set associated with each other is mapped may be allowed. When only one search space set is mapped, the terminal may monitor only one search space set from among the first search space set and the second search space set associated with each other. That is, the terminal may monitor only one PDCCH candidate from among the first PDCCH candidate and the second PDCCH candidate associated with each other between the first search space set and the second search space set. This may be referred to as (Method 130). In this case, the first and second search space sets may belong to the same reference time (e.g., the same slot or the same span). Alternatively, the first and second search space sets may belong to different reference times (e.g., different slots or different spans).

The number of blind decoding for two PDCCH candidates associated with each other belonging to the first and second search space sets may be counted a total of Y times. For example, Y may be fixed to 2. Alternatively, Y may be fixed to 3. The value of Y may be defined in the technical specification. Also, the value of Y may be defined as the capability of the terminal. The terminal may report the value of Y supported by the terminal to the base station, and the base station may set the value of Y applied to the blind decoding counting to the terminal by referring to the value of Y supported by the terminal. The above-described method may be applied when (Method 120) is used. Further, in the above-described method, even when only one PDCCH candidate among two PDCCH candidates associated with each other is monitored, the number of blind decoding may be counted Y times. According to this, the above-described method may be applied even when (Method 130) is used.

Alternatively, the blind decoding may be counted once for the associated PDCCH candidates belonging to the first and second search space sets, respectively. Accordingly, when only one PDCCH candidate among the two PDCCH candidates is mapped or when the terminal monitors only one PDCCH candidate among the two PDCCH candidates, the blind decoding may be counted once in total. When both the PDCCH candidates are mapped or when the terminal monitors both the PDCCH candidates, the blind decoding may be counted twice in total. Alternatively, when only one of the associated two PDCCH candidates is mapped or when the terminal monitors only one of the associated two PDCCH candidates, the blind decoding may be counted, respectively. In this case, the blind decoding may be counted once. When the two PDCCH candidates associated with each other are mapped or when the terminal monitors both the two PDCCH candidates associated with each other, the blind decoding may be counted Y times by the above-described method. Meanwhile, in addition to the blind decoding for each PDCCH candidate, the terminal may perform blinding decoding once more by performing a soft combining operation of DCIs for the two PDCCH candidates. In this case, blind decoding for the first PDCCH candidate among the associated two PDCCH candidates belonging to the first and second search space sets may be counted once, and the blind decoding for the second PDCCH candidate may be counted twice. Here, the first and second PDCCH candidates (e.g., a search space set to which each of the first and second PDCCH candidates belongs, mapping resources of the first and second PDCCH candidates, etc.) may be determined through configuration from the base station. Alternatively, the first and second PDCCH candidates (e.g., a search space set to which each of the first and second PDCCH candidates belongs, mapping resources of the first and second PDCCH candidates, etc.) may be determined by an order of a blind decoding of the terminal. The above-described method may be applied when (Method 130) is used.

When only some of the PDCCH candidates associated with each other are mapped due to the constraint of $N_{BD}$, the terminal may still perform a PDCCH monitoring operation on the mapped some PDCCH candidate(s). For example, when only one PDCCH candidate among the two PDCCH candidates associated with each other is mapped, the terminal may perform a blind decoding operation on the mapped one PDCCH candidate. In this case, the PDCCH candidate may still be regarded as a PDCCH candidate for repetitive PDCCH transmission. That is, the repetitive PDCCH transmission method (e.g., PDCCH reception operation, data channel transmission/reception operation, HARQ-ACK feedback operation, DCI format payload configuration, etc.) described in the exemplary embodiments may be used for monitoring and reception of the PDCCH candidate. In addition, one PDCCH candidate (or a resource of a PDCCH candidate) among the associated PDCCH candidates for the above-described operation may be a reference PDCCH candidate (or a resource of the PDCCH candidate). In this case, the reference PDCCH candidate may be determined regardless of whether the above-described PDCCH candidate(s) are mapped. For example, among the PDCCH candidates associated with each other, a PDCCH candidate having a later end symbol (or an earlier start symbol) may be regarded as the reference PDCCH candidate, and a location of a time resource (e.g., start symbol) of a PDSCH, whether to apply a default beam to the PDSCH, HARQ-ACK codebook configuration, and the like may be determined by the reference PDCCH candidate or the resource of the reference PDCCH candidate. In this case, with respect to the associated PDCCH candidates, a reference PDCCH candidate when all the associated PDCCH candidates are mapped may match a reference PDCCH candidate when only some PDCCH candidates are mapped. In addition, a PDCCH candidate mapped by the above-described method may be configured as the reference PDCCH candidate. Alternatively, a PDCCH candidate not mapped by the above-described method may be configured as the reference PDCCH candidate.

As another method, in the case described above, the PDCCH candidate may be regarded as a PDCCH candidate for single PDCCH transmission. The repetitive PDCCH transmission method (e.g., PDCCH reception operation, data channel transmission/reception operation, HARQ-ACK feedback operation, DCI format payload configuration, etc.) described in the exemplary embodiments may not be applied to the monitoring and reception operation of the PDCCH candidate. The location of the time resource (e.g., start symbol) of a PDSCH, whether to apply a default beam to the PDSCH, HARQ-ACK codebook configuration, and the like may be determined by the mapped PDCCH candidate or the resource of the mapped PDCCH candidate. Alternatively, the above-described reference PDCCH candidate may be determined based on whether or not the associated PDCCH candidate(s) are mapped. For example, a mapped PDCCH candidate among the associated PDCCH candidates may be regarded as a reference PDCCH candidate, and an unmapped PDCCH candidate among the associated PDCCH candidates may not be regarded as a reference PDCCH candidate. For example, only the first PDCCH candidate among the associated first and second PDCCH candidates may be mapped. In this case, the mapped first PDCCH candidate may be regarded as the reference PDCCH candidate regardless of the above-described condition (e.g., the order of the end symbol).

As still another method, when only some PDCCH candidate(s) among the PDCCH candidates associated with each other are mapped, the terminal may omit a blind decoding operation on the mapped some PDCCH candidate(s). In other words, if the blind decoding operation for some PDCCH candidate(s) among the associated PDCCH candidates is omitted by a PDCCH blind decoding number counting rule, the terminal may also omit the blind decoding operation for the remaining PDCCH candidate(s). In this case, even when the blind decoding operation of the PDCCH candidate(s) is omitted, the number of blind decoding of the PDCCH candidate(s) may be counted by the above-described method.

Meanwhile, the terminal may omit monitoring of some of the PDCCH candidate(s) among the associated PDCCH candidates by a condition other than the PDCCH blind decoding number counting rule. For example, when some PDCCH candidate(s) among the associated PDCCH candidates overlap a specific resource (e.g., transmission resource of a specific downlink signal and channel, SS/PBCH block, CSI-RS, DM-RS, cell-specific reference signal (CRS) of the LTE system, transmission resource of a specific uplink signal and channel, PRACH, SRC), and/or when some PDCCH candidate(s) among the associated PDCCH candidates overlap an uplink symbol and/or flexible symbol, the terminal may omit blind decoding for the some PDCCH candidate(s). For another example, when resources (e.g., a set of CCEs) of some PDCCH candidate(s) among the associated PDCCH candidates completely overlap resources (e.g., a set of CCEs) of other PDCCH candidate(s) (e.g., third PDCCH candidate), and a predetermined condition is additionally satisfied, the terminal may omit blind decoding for the some PDCCH candidate(s). The predetermined condition may include at least one of a condition that the some PDCCH candidate(s) are included in a USS set and the third PDCCH candidate is included in a CSS set, a condition that the same DCI format (e.g., fallback DCI format, DCI format 0_1 or 1_0) is monitored in the some PDCCH candidate(s) and the third PDCCH candidate, a condition that DCI formats monitored in the some PDCCH candidate(s) and the third PDCCH candidate have the same size, a condition that the same scrambling is applied to the some PDCCH candidate(s) and the third PDCCH candidate, and a condition that CRCs of DCI formats monitored in the some PDCCH candidate(s) and the third PDCCH candidate are scrambled by the same RNTI (e.g., C-RNTI, CS-RNTI, MCS-C-RNTI). For another example, when the some PDCCH candidates among the associated PDCCH candidates overlap with a type 1 CSS set, and different QCLs (e.g., QCL type D) are applied to a search space set to which the some PDCCH candidate(s) belong and the type 1 CSS set, the terminal may omit blind decoding for the some PDCCH candidates. A DCI format (e.g., DCI format 1_0) having a CRC scrambled with an RA-RNTI may be transmitted in the type 1 CSS set. The terminal may perform blind decoding or may not perform blind decoding on the remaining PDCCH candidate(s) excluding the some PDCCH candidate(s) among the associated PDCCH candidates according to the above-described method.

Meanwhile, the PDCCH monitoring operation of the terminal may be dynamically changed. The base station may explicitly or implicitly indicate to the terminal a search space set group (SSSG) to be monitored by the terminal through DCI, and the terminal may monitor the SSSG indicated by the base station. In this case, when the SSSG indicated to the terminal is different from an SSSG currently being monitored by the terminal, the terminal may perform an SSSG switching operation from the current SSSG to the indicated SSSG. The SSSG may include one or more search space set(s). Alternatively, the SSSG may not include a search space set. When it is indicated to monitor an SSSG that does not include a search space set, the terminal may omit a PDCCH monitoring operation in a monitoring period of the corresponding SSSG. Alternatively, the terminal may monitor only search space set(s) (e.g., CSS set, type 0/0A/1/2 CSS set, etc.) to be monitored regardless of the SSSG switching. An SSSG that does not include a search space set may be referred to as a null SSSG, an empty SSSG, a dormant SSSG, or the like. In addition to or separately from the above-described operation, the base station may indicate the terminal to omit the PDCCH monitoring operation through DCI. As described above, this operation may be performed through a specific SSSG or a separate signaling operation. For example, the DCI may include information indicating that the terminal skips a PDCCH operation for a predetermined period. The above-described PDCCH monitoring change operation may be applied in units of slots. Even when the above-described method is used, the terminal may monitor the same search space set(s) within one slot.

The associated search space sets and/or the PDCCH candidates corresponding to the associated search space sets may belong to different SSSGs. Alternatively, it may be indicated to omit the PDCCH monitoring operation for some of the associated search space sets and/or the PDCCH candidates corresponding to the associated search space sets. In this case, only a monitoring operation for some of the associated search space sets and/or the PDCCH candidates corresponding to the associated search space sets may be valid. This operation may occur when the associated search space sets belong to different slots. In this case, the terminal may perform a PDCCH monitoring operation on the valid search space set(s) and/or the PDCCH candidate(s) corresponding to the valid search space set(s) according to the above-described method. Alternatively, by the above-described method, the terminal may omit the PDCCH monitoring operation for the valid search space set(s) and/or the PDCCH candidate(s) corresponding to the valid search space set(s).

Meanwhile, a PDSCH may be transmitted in a resource region other than a specific resource region. The remaining resource region excluding the specific resource region in a nominal resource region in which the PDSCH is allocated may be regarded as an available resource for PDSCH transmission, the PDSCH may be rate-matched according to the size of the remaining resource region, and the rate-matched PDSCH may be transmitted. The operation of rate-matching the PDSCH to the specific resource region or around the specific resource region may mean the above-described operation. For convenience, the specific resource region may be referred to as a rate matching resource or a reserved resource. In order to prevent collision between the PDSCH and a PDCCH, the reserved resource may include a CORESET. That is, all PDCCH monitoring occasions of all search space sets constituting a certain CORESET may be configured as a reserved resource, and the terminal may receive the corresponding PDSCH by rate matching the PDSCH on the reserved resources. To support this operation, configuration information of the reserved resource may include an ID of the CORESET to which the PDSCH is to be rate-matched.

When there are search space sets associated with each other between a plurality of CORESETs, repeatedly-transmitted PDCCHs may be transmitted using resources of the plurality of CORESETs. In this case, in order to prevent collision between the PDSCH and the PDCCH, the base station may configure all of the plurality of CORESETs to the terminal as reserved resources. However, according to this method, all the search space sets of the plurality of CORESETs (e.g., all search space sets including search space set(s) not used for repetitive PDCCH transmission) are configured as reserved resources, thereby reducing resource efficiency. As another method, the terminal may configure at least one search space set (or CORESET corresponding to at least one search space set) among the associated search space sets as a reserved resource in the terminal. In this case, the terminal may regard all the search space sets associated with each other as reserved resources. The terminal may receive a PDSCH by rate matching the PDSCH in all the associated search space sets (or time-frequency resources to which PDCCH monitoring occasions corresponding to all the associated search space sets are mapped). Alternatively, at least one PDCCH candidate (or a search space set or CORESET corresponding to the at least one PDCCH candidate) among the associated PDCCH candidates may be configured as a reserved resource in the terminal. In this case, the terminal may consider all the associated PDCCH candidates as reserved resources. The terminal may receive the corresponding PDSCH by performing PDSCH rate matching on the resources of all the associated PDCCH candidates. The above-described method may be referred to as (Method 140).

Figure 9:
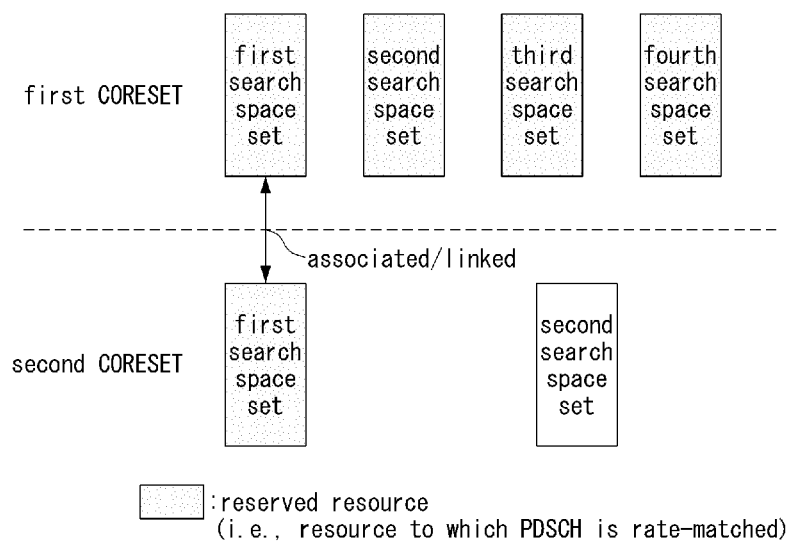
FIG. 9 is a conceptual diagram illustrating a first exemplary embodiment of a PDSCH rate matching method.

FIG. 9 is a conceptual diagram illustrating a first exemplary embodiment of a PDSCH rate matching method.

Referring to FIG. 9, the terminal may receive configuration information of first and second CORESETs from the base station. That is, the first and second CORESETs may be configured in the terminal. The first CORESET may include first to fourth search space sets, and the second CORESET may include first and second search space sets. In this case, the first search space set of the first CORESET and the first search space set of the second CORESET may be associated with each other. The first search space sets associated with each other between the first CORESET and the second CORESET may be used for repetitive PDCCH transmission. The first CORESET may be configured as a reserved resource in the terminal. In this case, the terminal may rate-match a PDSCH in all the search space sets (e.g., time-frequency resources of all the search space sets) included in the first CORESET. The terminal may regard a search space set of another CORESET (e.g., the first search space set of the second CORESET (e.g., time-frequency resource of the first search space set)) associated with the search space set (e.g., the first search space set) of the first CORESET as a reserved resource, and may rate-match the PDSCH on the reserved resource. Alternatively, the terminal may regard a PDCCH candidate of another CORESET (e.g., PDCCH candidate of the first search space set of the second CORESET) associated with the PDCCH candidate of the first CORESET (e.g., PDCCH candidate of the first search space set) as a reserved resource by (Method 140). The above-described operation may be performed regardless of whether the second CORESET is configured as a reserved resource. In an exemplary embodiment, even when the second CORESET is not configured as a reserved resource, the terminal may regard some search space sets or some PDCCH candidates of the second CORESET as a reserved resource by the above-described method.

[Overlapping of Associated PDCCH Candidates]

The search space sets associated with each other (or, CORESETs corresponding to the search space sets associated with each other, PDCCH monitoring occasions corresponding to the search space sets associated with each other) may be arranged in the same slot or different slots. In this case, resources of the associated search space sets may not overlap with each other. For example, the associated search space sets may be allocated in different symbol sets. Alternatively, the associated search space sets may be allocated in different RE sets. Alternatively, resources of the associated PDCCH candidates may not overlap with each other. The associated PDCCH candidates may be mapped to different CCE sets (or different REG sets, different RE sets). This may be referred to as (Method 150).

Meanwhile, at least two methods may be considered for PDCCH DM-RS mapping. As a first method, a PDCCH DM-RS may be mapped only to REG(s) (or PRB(s) and/or symbol(s)) through which a PDCCH is transmitted. For example, a PDCCH DM-RS may be mapped to all REGs through which a PDCCH is transmitted. In the first method, a PDCCH DM-RS may be referred to as a narrowband PDCCH DM-RS for convenience. As a second method, a PDCCH DM-RS may be mapped to all REGs constituting a CORESET. Alternatively, a CORESET may be mapped to one or more frequency cluster(s), and a PDCCH DM-RS may be mapped to all REGs constituting the frequency cluster(s) through which the terminal receives a PDCCH. A frequency cluster may refer to a resource composed of consecutive PRBs and/or symbol(s) among PRBs constituting a CORESET. In the second method, a PDCCH DM-RS may be referred to as a wideband PDCCH DM-RS for convenience. The terminal may assume one of the narrowband PDCCH DM-RS and the wideband PDCCH DM-RS, and may perform a PDCCH reception operation using the assumed PDCCH DM-RS. The above assumption may be applied for each CORESET. The base station may configure a PDCCH DM-RS mapping type (e.g., narrowband PDCCH DM-RS or wideband PDCCH DM-RS) for each CORESET to the terminal.

When a wideband PDCCH DM-RS is configured for a first search space set (or, CORESET or PDCCH monitoring occasion corresponding to the first search space set) among first and second search space set associated with each other, a PDCCH candidate of the second search space set may overlap with a PDCCH DM-RS of the first search space set. For example, even when a PDCCH candidate of the second search space set does not overlap with a PDCCH candidate of the first search space set, which is associated therewith, the PDCCH candidate of the second search space set may overlap with a PDCCH DM-RS of the first search space set. Along with this operation, a wideband PDCCH DM-RS may be configured for the second search space set (or, CORESET or PDCCH monitoring occasion corresponding to the second search space set). In this case, a PDCCH candidate of the first search space set may overlap with a PDCCH DM-RS of the second search space set. When the above-described overlap occurs, reception performance of at least one of the PDCCH candidate and the PDCCH DM-RS may be deteriorated. Accordingly, the overlap between a PDCCH candidate and a PDCCH DM-RS may be additionally considered in (Method 150). The associated PDCCH candidates may not overlap each other, and at the same time, each of the associated PDCCH candidates may not overlap with a PDCCH DM-RS (e.g., wideband PDCCH DM-RS) of a counterpart search space set (or counterpart PDCCH candidate). The above-described method may be applied when a PDCCH DM-RS of at least one search space set (or CORESET corresponding to the at least one search space set) is configured as a wideband PDCCH DM-RS.

Wideband PDCCH DM-RSs may be configured in all of the first and second search space sets associated with each other (or, CORESETs corresponding to the associated first and second search space sets). In this case, when resource regions of the associated first and second search space sets (or CORESETs corresponding to the associated first and second search space sets) overlap, the PDCCH DM-RSs transmitted for the first and second search space sets may overlap each other. According to this operation, PDCCH reception performance may be deteriorated. To solve this problem, a frequency shift may be applied to RE mapping of the wideband PDCCH DM-RSs. For example, the location of subcarriers to which the wideband PDCCH DM-RS is mapped in each search space set (or CORESET corresponding to each search space set) may be shifted in units of subcarriers (e.g., L subcarrier(s)) according to configuration from the base station. Different shift values (e.g., L values) may be configured to different CORESETs. According to this operation, the wideband PDCCH DM-RSs may not collide with each other in the first and second search space sets that overlap each other. As a method different from the above-described method, the terminal may not expect that wideband PDCCH DM-RSs are not configured in all of the associated first and second search space sets (or CORESETs corresponding to the associated first and second search space sets). As another method, the terminal may not expect that wideband PDCCH DM-RSs are configured in any search space set (or, CORESET to the search space set) of the associated first and second search space sets (or CORESETs corresponding to the associated first and second search space sets).

[Data Channel Scheduling By Associated PDCCH Candidates]

The base station may indicate bandwidth part switching to the terminal through DCI repeatedly transmitted through PDCCH candidates associated with each other. When bandwidth part switching is indicated, the terminal may start a transmission/reception operation in a new bandwidth part from one slot (or, the first symbol of the corresponding slot) after the indication time of the bandwidth part switching. In this case, the above-described slot may be one slot after a predetermined time (e.g., a predetermined number of symbols or a predetermined number of slots) from a resource to which one PDCCH candidate among the associated PDCCH candidates is mapped (e.g., a last symbol to which the corresponding PDCCH candidate is mapped or a slot to which the corresponding PDCCH candidate is mapped). In this case, the associated PDCCH candidates (or search space sets corresponding to the associated PDCCH candidates) through which DCI(s) indicating the bandwidth part switching are transmitted may be limitedly mapped within the first Z symbols of the slot. For example, the associated PDCCH candidates (or search space sets corresponding to the associated PDCCH candidates) may be limitedly mapped within the first Z symbols of the same slot. For another example, the associated PDCCH candidates (or search space sets corresponding to the associated PDCCH candidates) may be limitedly mapped within the first Z symbols in each of different slots. According to an exemplary embodiment, Z may be 3. The value of Z may be defined in the technical specification, and may be shared between the base station and the terminal. Alternatively, the associated PDCCH candidates (or search space sets corresponding to the associated PDCCH candidates) may be mapped to a resource region including other symbols in addition to the first Z symbols of the slot. The above-described mapping method may be applied regardless of whether the repeatedly-transmitted DCI indicates bandwidth part switching. In addition, the above-described mapping method may be applied regardless of a subcarrier spacing of a bandwidth part. For example, the above-described mapping method may be applied even when a subcarrier spacing of the bandwidth part is not 15 kHz (e.g., when the subcarrier spacing is 30, 60, 120, 240, 480, 960 kHz, etc.).

According to the above-described method, the terminal may expect to receive one or two PDCCH(s) for scheduling of the same TB(s). The base station may arbitrarily determine the number (e.g., 1 or 2) of PDCCHs to be transmitted for each scheduling. A single PDCCH transmission scheme and a multiple PDCCH transmission scheme (e.g., repetitive PDCCH transmission scheme) may be dynamically switched to each other. Accordingly, a degree of freedom in scheduling by the PDCCH of the base station may be increased. Alternatively, even when the above-described method is used, the terminal may receive configuration information of the number of PDCCHs (e.g., the maximum number of PDCCHs) that the terminal may expect to receive for each scheduling from the base station. The configuration of the maximum number of PDCCHs may be independently applied to downlink scheduling and uplink scheduling. For example, the terminal may expect to receive a maximum of two PDCCHs for each downlink TB scheduling, and may expect to receive a maximum of one PDCCH for each uplink TB scheduling based on the configuration from the base station. The configuration of the maximum number of PDCCHs may be applied for each PDCCH monitoring resource pool, CORSET(s), or search space set(s).

The above-described method may be applied when a PDSCH is scheduled by a PDSCH mapping type B. When a PDSCH is scheduled by the PDSCH mapping type B, a relative distance between a start symbol of the PDSCH and a symbol (e.g., start symbol) in which a PDCCH scheduling the PDSCH is transmitted may be limited. When (Method 100) is used, since the same PDSCH is scheduled by a plurality of PDCCHs, resource allocation of the PDSCH may be performed so that the start symbol of the PDSCH does not precede the start symbols of the PDCCHs scheduling the PDSCH. That is, when the first symbol of the earliest PDCCH among the PDCCH(s) scheduling the PDSCH is later than the first symbol of the PDSCH, the terminal may not receive the corresponding PDSCH. In addition, as described above, when (Method 100) is used, the start symbol (i.e., S) of the PDSCH indicated by the DCI may be interpreted as a symbol offset from a symbol in which one PDCCH (or, PDCCH candidate corresponding to the one PDCCH) among the plurality of PDCCHs scheduling the PDSCH (e.g., associated PDCCH candidates corresponding to the plurality of PDCCHs) is transmitted.

The one PDCCH (or PDCCH candidate corresponding to the one PDCCH) used as the reference time may be a PDCCH candidate having a lowest or highest ID of the corresponding search space set (or CORESET). Alternatively, the one PDCCH (or PDCCH candidate corresponding to the one PDCCH) used as the reference time may be a PDCCH candidate having a later start symbol (or end symbol) among the associated PDCCH candidates. Alternatively, the one PDCCH used as the reference time (or PDCCH candidate corresponding to the one PDCCH) may be a PDCCH candidate having an earlier start symbol (or end symbol) among the associated PDCCH candidates. In this case, when the start symbols (or end symbols) of the associated PDCCH candidates are the same, the terminal may regard an arbitrary PDCCH among the associated PDCCH candidates as a reference PDCCH candidate, and based on the regarded reference PDCCH candidate, may identify a resource location of the PDSCH, and receive the PDSCH in the identified resource location. Alternatively, when the start symbols (or end symbols) of the associated PDCCH candidates are the same, the terminal may determine a reference PDCCH candidate based on an additional rule. For example, the additional rule may be a rule for selecting a PDCCH candidate having a lowest or highest ID of the corresponding search space set (or CORESET). Through the above-described method, even when the PDSCH mapping type B is used, the same PDSCH (or the same PDSCHs, the same PDSCH instance(s) constituting repetitive transmission) may be scheduled by a plurality of repeatedly-transmitted PDCCHs. When the above-described method is used, a symbol offset between the start symbol of the PDSCH and a symbol of the PDCCH (e.g., the start symbol of the reference PDCCH candidate) may be an integer greater than or equal to 0. That is, the symbol offset may not have a negative value.

As described above, (Method 100) may be applied even when a plurality of repeatedly-transmitted PDCCHs are transmitted in different slots. In this case, the slot in which the PDSCH is transmitted may be determined based on a slot in which one PDCCH (or PDCCH candidate corresponding to the one PDCCH) among the plurality of PDCCHs (or associated PDCCH candidates corresponding to the plurality of PDCCHs) for scheduling the PDSCH is transmitted. For example, slot offset information (e.g., slot offset) may be configured to the terminal of the PDSCH through scheduling DCI or RRC signaling. The slot offset may be interpreted as a slot distance between the slot in which the PDSCH is transmitted and the slot in which the one PDCCH is transmitted.

The one PDCCH used as the reference time (or PDCCH candidate corresponding to the one PDCCH) may be a PDCCH candidate having a lowest or highest ID of the corresponding search space set (or CORESET). Alternatively, the one PDCCH used as the reference time (or PDCCH candidate corresponding to the one PDCCH) may be a PDCCH candidate that is transmitted later (e.g., transmitted in a later transmission slot) among the associated PDCCH candidates. Alternatively, the one PDCCH used as the reference time (or PDCCH candidate corresponding to the one PDCCH) may be a PDCCH candidate that is transmitted earlier (e.g., transmitted in an earlier transmission slot) among the associated PDCCH candidates. In addition to or separately from the above-described operation, the reference PDCCH candidate may be determined based on location of symbols through which PDCCH candidates are transmitted. For example, the one PDCCH used as the reference time (or PDCCH candidate corresponding to the one PDCCH) may be a PDCCH candidate located in a later start symbol (or late end symbol) among the associated PDCCH candidates. Alternatively, the one PDCCH used as the reference time (or PDCCH candidate corresponding to the one PDCCH) may be a PDCCH candidate located in an earlier start symbol (or early end symbol) among the associated PDCCH candidates.

In the above-described case, the terminal may interpret PDSCH time domain resource assignment information (e.g., a start symbol of a PDSCH, a slot offset of the PDSCH, etc.) indicated by the DCI (e.g., DCI received through a PDCCH candidate not used as the reference time), a feedback timing of an HARQ-ACK corresponding to the PDSCH, a mapping order of the HARQ-ACK corresponding to the PDSCH in an HARQ-ACK codebook, or the like based on not a resource of the PDCCH candidate in which the corresponding DCI is received but a resource (i.e., a slot and/or symbol in which the reference PDCCH candidate is received) of the PDCCH candidate used as the reference time (i.e., PDCCH candidate used as the reference time among PDCCH candidate(s) associated with the PDCCH candidate in which the corresponding DCI is received). The terminal may identify a time resource in which the PDSCH is mapped based on the above-described interpretation, and may perform a PDSCH reception operation on the identified time resource.

(Method 100) may be applied when a PDSCH is scheduled by the PDSCH mapping type A. In this case, all PDCCHs scheduling a PDSCH may be transmitted only in the first L symbol(s) of the slot. Here, L may be a natural number. When all the PDCCH(s) scheduling the PDSCH are not received only within the first L symbol(s) of the slot, the terminal may not receive the corresponding PDSCH. For example, L may be 3. For another example, L may be defined (or set) as a value greater than 3. In addition to or separately from the above-described operation, the terminal may obtain the value of L from the base station. The value of L may be used only when the above-described methods (e.g., a multi-TRP-based PDCCH transmission method) are used. For example, the value of L may be applied only to search space sets associated with each other (or PDCCH candidates corresponding to the associated search space sets).

Figure 10A:
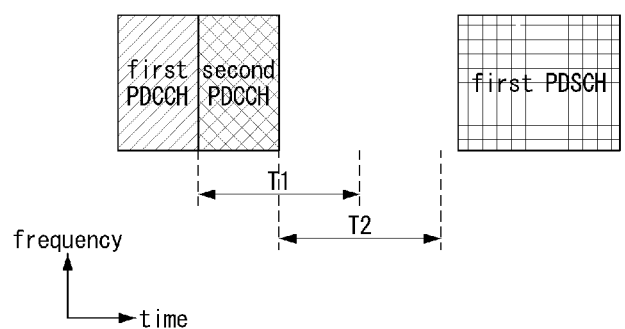
FIG. 10A is a conceptual diagram illustrating a first exemplary embodiment of a method for allocating PDCCH and PDSCH resources.
Figure 10B:
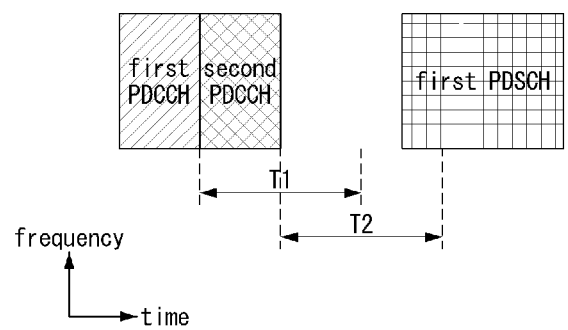
FIG. 10B is a conceptual diagram illustrating a second exemplary embodiment of a method for allocating PDCCH and PDSCH resources.
Figure 10C:
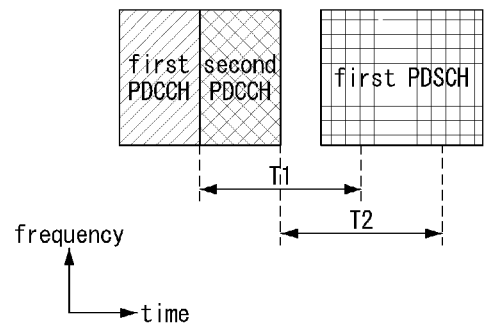
FIG. 10C is a conceptual diagram illustrating a third exemplary embodiment of a method for allocating PDCCH and PDSCH resources.

FIG. 10A is a conceptual diagram illustrating a first exemplary embodiment of a method for allocating PDCCH and PDSCH resources, FIG. 10B is a conceptual diagram illustrating a second exemplary embodiment of a method for allocating PDCCH and PDSCH resources, and FIG. 10C is a conceptual diagram illustrating a third exemplary embodiment of a method for allocating PDCCH and PDSCH resources.

Referring to FIGS. 10A to 10C, the exemplary embodiments of FIGS. 10A to 10C may be implemented by (Method 100). The terminal may receive DCI(s) on a plurality of PDCCHs (e.g., first and second PDCCHs) or a plurality of PDCCH candidates (e.g., first and second PDCCH candidates), and may obtain scheduling information of a PDSCH (e.g., a first PDSCH) from the received DCI(s). According to the above-described method, the plurality of PDCCH candidates (e.g., first and second PDCCH candidates) may be associated with each other.

T1 may refer to a time offset from the first PDCCH (or the first PDCCH candidate). T2 may refer to a time offset from the second PDCCH (or the second PDCCH candidate). Each time offset may refer to a time (or the number of symbols or slots corresponding to the time) corresponding to a reception processing time of the first or second PDCCH performed by the terminal. According to an exemplary embodiment, T1 may be the same as T2. In the exemplary embodiment of FIG. 10A, the first PDSCH may be allocated after T1 (or T1 symbols) from an end time of the first PDCCH candidate. In addition, the first PDSCH may be allocated after T2 (or T2 symbols) from an end time of the second PDCCH candidate. The terminal may decode DCI during the times T1 and T2, and may obtain information on a TCI state (e.g., spatial QCL) of the first PDSCH. The terminal may form a reception beam for the first PDSCH based on the information on the TCI state (e.g., spatial QCL), and may perform a reception operation of the first PDSCH based on the reception beam. In this case, by the above-described method, each DCI received (or monitored) through the first or second PDCCH candidate may include a TCI field (or the information on the TCI state). Alternatively, one of the DCIs received through the first and second PDCCH candidates may include a TCI field (or the information on the TCI state). The terminal may receive configuration information of a CORESET (hereinafter referred to as 'first CORESET') through which the first PDCCH is transmitted and configuration information of a CORESET (hereinafter referred to as 'second CORESET') through which the second PDCCH is transmitted. The terminal may regard that each DCI received through the first or second PDCCH includes a TCI field based on the configuration information of the first and second CORESETs. Alternatively, the terminal may regard that one DCI among the DCIs received through the first and second PDCCHs includes a TCI field based on the configuration information of the first and second CORESETs.

On the other hand, when each DCI received (or monitored) through the first or second PDCCH does not include a TCI field, the terminal may assume that the first PDSCH has a QCL relation with at least one CORESET among the first and second CORESETs. For example, the terminal may assume that the first PDSCH has a QCL relation with a CORESET having a lower or higher ID among the first and second CORESETs. Alternatively, the terminal may assume that the first PDSCH has a QCL relation with a CORESET corresponding to a search space set having a lower or higher ID among the search space sets to which the first and second PDCCHs belong. Alternatively, the terminal may assume that the first PDSCH has a QCL relation with an earlier CORESET (e.g., a CORESET associated with a PDCCH (or, PDCCH candidate) whose start symbol or end symbol is earlier) among the first and second CORESETs, or may assume that the first PDSCH has a QCL relation with a later CORESET (e.g., a CORESET associated with a PDCCH (or, PDCCH candidate) whose start symbol or end symbol is later) among the first and second CORESETs. On the other hand, when only one DCI of the DCIs received (or monitored) through the first and second PDCCHs includes the TCI state information of the PDSCH, the terminal may assume the first PDSCH has a QCL relation with a CORESET to which a PDCCH candidate corresponding to the DCI belongs. Alternatively, in the above-described case, the terminal may assume that the first PDSCH has a QCL relation with a CORESET that satisfies a predetermined condition. For example, the CORESET that satisfies a predetermined condition may be a CORESET having the lowest ID (or the highest ID) in the latest slot in which the CORESET(s) exist. The CORESET satisfying the predetermined condition may coincide with the first CORESET or the second CORESET. Alternatively, the CORESET satisfying the predetermined condition may not coincide with the first CORESET or the second CORESET.

In the exemplary embodiment of FIG. 10C, the first PDSCH may be allocated before a time after T1 (or, T1 symbols) from a reception end time of the first PDCCH (or the first PDCCH candidate). In addition, the first PDSCH may be allocated before a time after T2 (or, T2 symbols) from a reception end time of the second PDCCH (or the second PDCCH candidate). As described above, T1 and T2 may coincide. That is, the first PDSCH may be allocated before a time after T2(=T1) (or, T2=T1) symbols) from the reception end time (e.g., end symbol) of the second PDCCH candidate. In this case, it may be difficult for the terminal to complete the decoding of the first and second PDCCHs before a time when the first PDSCH is received. As a result, it may be difficult for the terminal to obtain TCI state information for reception of the first PDSCH. In this case, the terminal may determine a CORESET having a QCL relation with the first PDSCH according to a predetermined criterion. For example, the terminal may assume that the first PDSCH has a QCL relation with a CORESET having the lowest ID (or the highest ID) among the CORESET(s) in the latest slot in which the CORESET(s) exist. Here, the CORESET(s) may be all CORESET(s) configured in the terminal (e.g., all CORESET(s) configured in a carrier or active bandwidth part). Alternatively, the CORESET(s) may be CORESETs (e.g., the first CORESET and the second CORESET) corresponding to the search space sets associated with each other. The latest slot may be a slot that satisfies the above-described condition among slots before the slot to which the first and second PDCCH candidates (or the first and second PDSCHs) are mapped. Alternatively, the latest slot may be a slot that satisfies the above-described condition among the slot to which the first and second PDCCH candidates (or first and second PDSCHs) are mapped and slots prior to the slot. When the first PDCCH candidate is mapped to a first slot, the second PDCCH candidate is mapped to a second slot, and the first slot is ahead of the second slot, the latest slot may be a slot satisfying the above-described condition among the first slot and slots preceding the first slot. Alternatively, the latest slot may be a slot satisfying the above-described condition among the second slot and slots preceding the second slot. As another example of the predetermined criterion, the terminal may assume that one TCI state (e.g., a TCI state corresponding to the lowest index) among the TCI state(s) configured (or activated) to the first PDSCH is applied to the first PDSCH.

In the exemplary embodiment of FIG. 10B, the first PDSCH may be allocated after T1 (or T1 symbols) from the reception end time of the first PDCCH (or the first PDCCH candidate). In addition, the first PDSCH may be allocated before a time after T2 (or, T2 symbols) from the reception end time of the second PDCCH (or the second PDCCH candidate). As described above, T1 and T2 may coincide. In this case, the terminal may complete the decoding of the first PDCCH before the time when the first PDSCH is received, but it may be difficult to complete the decoding of the second PDCCH before the time when the first PDSCH is received. Accordingly, the terminal may obtain TCI state information (e.g., QCL information) of the first PDSCH only when receiving the first PDCCH. In this case, when the DCI is successfully received through the first PDCCH candidate, the terminal may form a reception beam for the first PDSCH based on TCI state information (e.g., spatial QCL information) of the first PDSCH obtained from the received DCI, and may perform a reception operation of the first PDSCH based on the reception beam. In addition, when the DCI received through the first PDCCH does not include a TCI field, the terminal may assume that the first PDSCH has a QCL relation with a CORESET through which the first PDCCH is transmitted. The first PDCCH may be generalized as 'at least one PDCCH among PDCCH(s) for which a PDCCH reception processing time is secured before the time when the PDSCH is received'. Alternatively, even in the above-described case, the QCL relation of the first PDSCH may be determined by the method described in the first exemplary embodiment of FIG. 10A or the third exemplary embodiment of FIG. 10C.

[HARQ-ACK Timing Indication Method]

The terminal may report HARQ-ACK information to the base station in response to reception of a PDSCH. The HARQ-ACK information may be ACK, negative-acknowledgement (NACK), or discontinuous transmission (DTX). The HARQ-ACK information may be transmitted on an uplink channel (e.g., PUCCH, PUSCH). The base station may configure or indicate a feedback timing (e.g., transmission timing) of HARQ-ACK to the terminal. The HARQ-ACK transmission timing of the terminal (hereinafter, referred to as 'HARQ-ACK timing') may be determined based on a reception timing of the PDSCH. For example, when the PDSCH is received in the n-th slot, n-th symbol, or n-th subslot, it may be indicated or configured for the terminal to transmit the HARQ-ACK in the (n+k)-th slot, (n+k)-th symbol, or (n+k)-th subslot. Here, each of n and k may be a natural number. The terminal may obtain a value of k from the base station. That is, the value of k may be indicated or configured to the terminal. Alternatively, the value of k may be predefined in the technical specification, and may be shared between the base station and the terminal.

According to (Method 110), the terminal may schedule different PDSCHs through a plurality of PDCCHs, and the plurality of PDSCHs may include the same TB(s). In addition, the plurality of PDSCHs may be received in different time resources. Meanwhile, the terminal may obtain one HARQ-ACK timing from DCIs (e.g., DCI payloads) received through the PDCCHs. The terminal may apply the HARQ-ACK timing to each of the plurality of PDSCHs, and may derive a HARQ-ACK transmission time corresponding to each of the plurality of PDSCHs. The HARQ-ACK transmission time corresponding to each of the plurality of PDSCHs may be different.

FIG. 11A is a conceptual diagram illustrating a first exemplary embodiment of an HARQ-ACK transmission method for the same TB and a plurality of PDSCHs, and FIG. 11B is a conceptual diagram illustrating a second exemplary embodiment of an HARQ-ACK transmission method for the same TB and a plurality of PDSCHs.

Referring to FIGS. 11A and 11B, the exemplary embodiments of FIGS. 11A and 11B may be implemented by (Method 110). For example, the terminal may receive scheduling information of a plurality of PDSCHs (e.g., first and second PDSCHs) through a plurality of PDCCHs (e.g., first and second PDCCHs). The plurality of PDSCHs (e.g., first and second PDSCHs) may include the same TB(s). The plurality of PDSCHs (e.g., first and second PDSCHs) may be received in different time resources. In the exemplary embodiment of FIG. 11A, the first PDSCH may be received in the slot n, and the second PDSCH may be received in the slot (n+1). In the exemplary embodiment of FIG. 11B, the first PDSCH may be received in a first subslot of the slot n, and the second PDSCH may be received in a second subslot of the slot n. Here, n may be an integer greater than or equal to 0.

The terminal may obtain one HARQ-ACK transmission timing from DCIs (e.g., DCI payloads) received through the PDCCHs (e.g., first and second PDCCHs). The terminal may apply the HARQ-ACK transmission timing to each of the plurality of PDSCHs (e.g., first and second PDSCHs), and may derive a HARQ-ACK transmission time corresponding to each of the plurality of PDSCHs. The HARQ-ACK transmission times (e.g., first and second HARQ-ACK transmission times) corresponding to the plurality of PDSCHs may be different from each other. In the exemplary embodiment of FIG. 11A, the first HARQ-ACK transmission time may be the slot (n+2), and the second HARQ-ACK transmission time may be the slot (n+3). The terminal may transmit an HARQ-ACK through the first PUCCH in the slot (n+2), and may transmit an HARQ-ACK through the second PUCCH in the slot (n+3). In the exemplary embodiment of FIG. 11B, the first HARQ-ACK transmission time may be a first subslot in the slot (n+1), and the second HARQ-ACK transmission time may be a second subslot in the slot (n+1). The terminal may transmit an HARQ-ACK through the first PUCCH in the first subslot of the slot (n+1), and may transmit an HARQ-ACK through the second PUCCH in the second subslot of the slot (n+1).

As in the above-described exemplary embodiments, when the terminal repeatedly transmits HARQ-ACKs at a plurality of times for the same downlink TB(s), uplink resource efficiency may be reduced. In addition, the base station may perform blind decoding (e.g., blind decoding for PUCCH or PUSCH) at a plurality of times for the HARQ-ACK reception. According to this operation, the reception complexity of the base station may be increased.

As a method for solving the above-described problem, a new method of indicating an HARQ-ACK transmission timing may be used. According to a proposed method, the HARQ-ACK transmission timing of the terminal may be determined based on a new time, not the PDSCH reception timing. For example, the HARQ-ACK transmission timing may be defined as an absolute time within an HARQ frame (e.g., a slot, subslot, symbol, or index thereof within the HARQ frame). Here, 'index' may be used in the same sense as 'number'. The HARQ frame may be a frame in which the HARQ-ACK is transmitted. The terminal may receive information on the absolute time within the HARQ frame (e.g., slot, subslot, symbol, or index thereof within the HARQ frame) and/or information on the HARQ frame (e.g., specific HARQ frame, or index thereof) from the base station, and derive the HARQ-ACK transmission timing based on the received information. For example, the above-described information may be included in scheduling DCI, and the corresponding scheduling DCI may be transmitted to the terminal on a PDCCH. Here, 'HARQ frame' may be merely a term for referring to a reference time period for determining the HARQ-ACK transmission timing of the terminal. The concept of the HARQ frame may also be referred to in other terms. The above-described method may be referred to as (Method 200).

Figure 12:
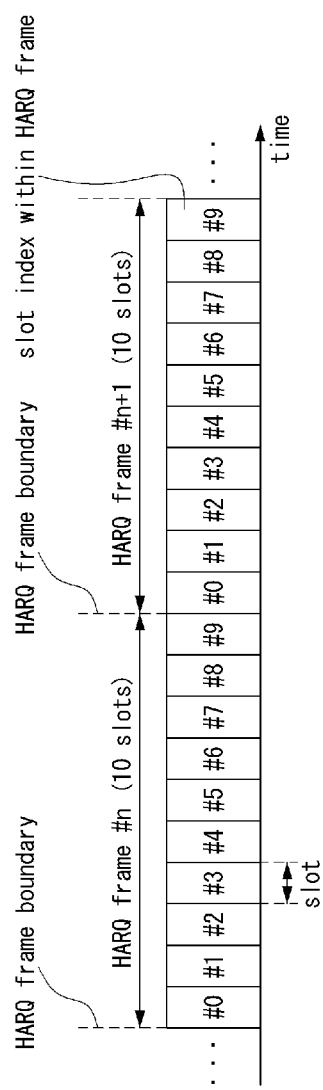
FIG. 12 is a conceptual diagram illustrating a first exemplary embodiment of an HARQ frame configuration method.

FIG. 12 is a conceptual diagram illustrating a first exemplary embodiment of an HARQ frame configuration method.

Referring to FIG. 12, one HARQ frame may refer to a continuous time period having a predetermined length or duration. The HARQ frame may appear periodically and repeatedly. An HARQ frame n may be adjacent to an HARQ frame (n+1). Here, n may be an integer greater than or equal to 0. The length of the HARQ frame may be the same as a periodicity of the HARQ frame. The length of the HARQ frame may be referred to as THF. Within one radio frame or two consecutive radio frames, p (e.g., p=(10/THF) or p=(20/THF)) HARQ frame(s) may be arranged. Alternatively, the HARQ frame may include j consecutive radio frames. Here, each of p and j may be an integer. A time offset may be applied to the HARQ frame, and an HARQ frame boundary may not be aligned with a radio frame boundary. For example, one radio frame or two consecutive radio frames may include a partial HARQ frame. Alternatively, one HARQ frame may include a partial radio frame. Each HARQ frame may include consecutive slot(s), consecutive subslot(s), and/or consecutive symbol(s). For example, one HARQ frame may include 10 slots. An index of a slot within the HARQ frame may be one of 0 to 9.

The base station may inform the terminal of configuration information of the HARQ frame through a signaling procedure. The configuration information of the HARQ frame may include the length of the HARQ frame (i.e., THF), the number of slots constituting the HARQ frame (or the number of subslots, the number of symbols), the time offset of the HARQ frame, and the like.

Figure 13:
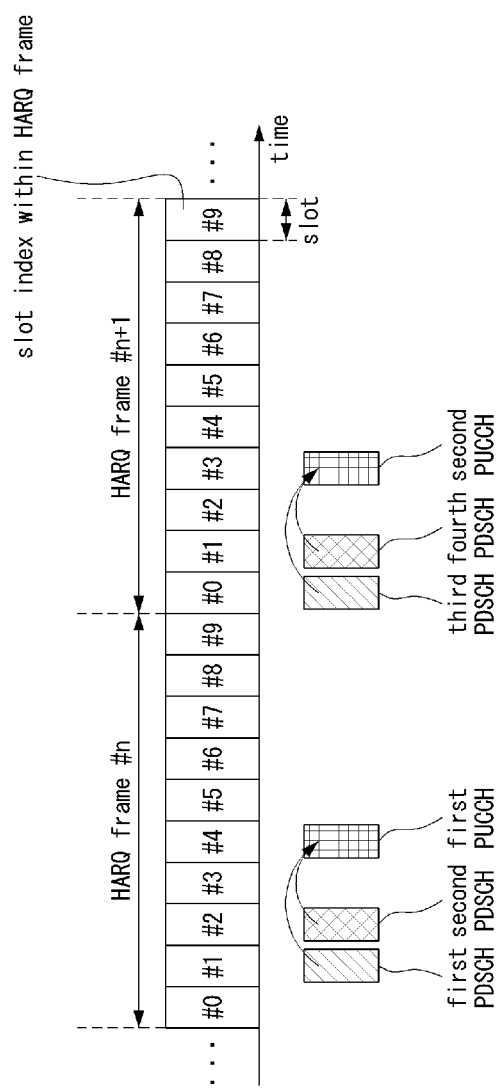
FIG. 13 is a conceptual diagram illustrating a first exemplary embodiment of an HARQ-ACK transmission timing indication method according to (Method 200)

FIG. 13 is a conceptual diagram illustrating a first exemplary embodiment of an HARQ-ACK transmission timing indication method according to (Method 200).

Referring to FIG. 13, an HARQ frame may include 10 consecutive slots. The terminal may receive a first PDSCH in the slot #1 (or time period corresponding to the slot #1) of the HARQ frame #n, and receive a second PDSCH in the slot #2 (or time period corresponding to the slot #2) of the HARQ frame #n. For example, the first and second PDSCHs may be scheduled by different PDCCHs according to (Method 110). In this case, the base station may indicate HARQ transmission timing corresponding to the first and second PDSCHs to the terminal through DCI based on (Method 200).

For example, the base station may indicate, to the terminal, the slot #4 (e.g., index of the corresponding slot) of the HARQ frame #n as the HARQ-ACK transmission timing corresponding to the first and second PDSCHs. In order to support this operation, information actually transmitted to the terminal may include only a slot index (e.g., 4) within the HARQ frame. In this case, the HARQ frame to which the HARQ-ACK transmission timing of the terminal belongs may be determined by a relation with reception times of the first and second PDSCHs and/or reception times of the PDCCHs corresponding to the first and second PDSCHs. For example, the terminal may determine the earliest HARQ frame (e.g., HARQ frame #n) among HARQ frame(s) satisfying that the HARQ-ACK transmission timing exists after M slots (or subslots or symbols) from the PDSCH reception time as an HARQ frame in which the HARQ-ACK of the terminal is transmitted. M may be a natural number. Alternatively, M may be a positive integer including 0. The value of M may be predefined in the technical specification. In addition to or separately from the above-described operation, the value of M may be configured from the base station to the terminal. When the value of M is not configured to the terminal, the terminal may assume one default value for M. For example, the default value may be 0 or 1.

Alternatively, the information actually transmitted to the terminal may include a slot index (e.g., 4) within the HARQ frame and an HARQ frame index (e.g., n) of the HARQ frame. The terminal may transmit HARQ-ACK corresponding to the first and second PDSCHs to the base station in the slot #4 of the HARQ frame #n based on the information (e.g., n, 4) received from the base station. The HARQ-ACK may be transmitted on a PUCCH (e.g., the first PUCCH) or PUSCH.

In the exemplary embodiment of FIG. 11, the terminal may receive a third PDSCH in the slot #9 (or time period corresponding to the slot #9) of the HARQ frame #n, and may receive a fourth PDSCH in the slot #0 (or, time period corresponding to the slot #0) of the HARQ frame #n+1. For example, the third and fourth PDSCHs may be scheduled by different PDCCHs according to (Method 110). In this case, the base station may indicate HARQ-ACK transmission timing corresponding to the third and fourth PDSCHs to the terminal through DCI based on (Method 200).

For example, the base station may indicate to the terminal the slot #2 (or index of the corresponding slot) of the HARQ frame #(n+1) as the HARQ-ACK transmission timing corresponding to the third and fourth PDSCHs. In order to support this operation, information actually transmitted to the terminal may include only the slot index (e.g., 2) within the HARQ frame. The HARQ frame to which the HARQ-ACK transmission timing of the terminal belongs may be determined by a relation with reception times of the third and fourth PDSCHs and/or reception times of the PDCCHs corresponding to the third and fourth PDSCHs. Alternatively, the information actually transmitted to the terminal may include the slot index (e.g., 2) and an HARQ frame index (e.g., n+1) of the HARQ frame. The terminal may transmit HARQ-ACKs corresponding to the third and fourth PDSCHs to the base station in the slot #2 of the HARQ frame #n+1 based on the above-described information (e.g., n+1, 2) indicated by the base station. The HARQ-ACK may be transmitted on a PUCCH (e.g., the second PUCCH) or PUSCH.

The above-described HARQ-ACK transmission timing indication method may be used for (Method 110). In addition, the above-described HARQ-ACK transmission timing indication method may be used for general PDSCH transmission (e.g., PDSCH transmission by (Method 100), PDSCH transmission scheduled by single PDCCH transmission, etc.).

Meanwhile, according to the above-described method, a plurality of PDCCH candidates or search space sets corresponding to the plurality of PDCCH candidates may be associated with each other for repetitive PDCCH transmission. DCIs transmitted in the plurality of PDCCH candidates associated with each other may schedule different PDSCHs by (Method 110). In this case, the transmission timing of the HARQ-ACK for the scheduled TB may be determined based on a position of a resource to which one PDSCH among the plurality of PDSCHs is mapped. For example, the HARQ-ACK transmission timing may be determined based on a resource position of the PDSCH mapped to the latest resource.

Figure 14:
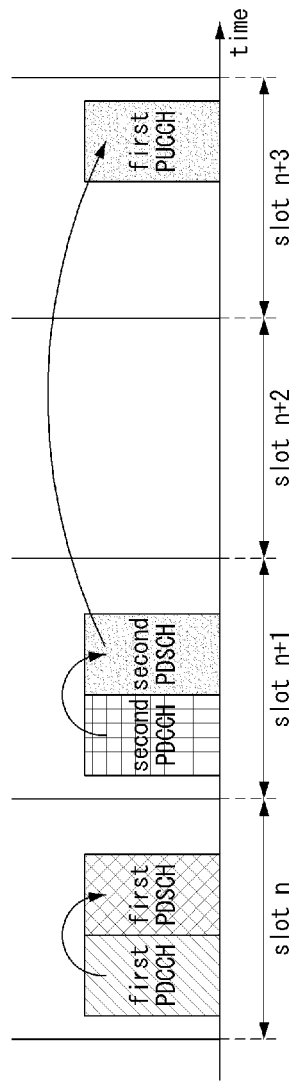
FIG. 14 is a conceptual diagram illustrating a third exemplary embodiment of an HARQ-ACK transmission method for the same TB and a plurality of PDSCHs.

FIG. 14 is a conceptual diagram illustrating a third exemplary embodiment of an HARQ-ACK transmission method for the same TB and a plurality of PDSCHs.

Referring to FIG. 14, the terminal may monitor a first PDCCH candidate in the slot n, and may monitor a second PDCCH candidate in the slot (n+1). DCI may be repeatedly transmitted through the first PDCCH candidate and the second PDCCH candidate, and the first PDCCH candidate and the second PDCCH candidate may be associated with each other. The DCI transmitted through the first PDCCH candidate and the DCI transmitted through the second PDCCH candidate may schedule a first PDSCH and a second PDSCH for the same TB (or TBs), respectively. The terminal may transmit an HARQ-ACK for the TB (or TBs) to the base station on an uplink channel (e.g., PUCCH, PUSCH). For example, the HARQ-ACK may be transmitted on a first PUCCH in the slot (n+3).

In this case, the HARQ-ACK transmission timing for the TB (or TBs) may be determined based on a resource position of the second PDSCH scheduled in a later resource (e.g., later slot) among the first and second PDSCHs. For example, the terminal may receive information indicating that a slot distance between the PDSCH and the HARQ-ACK through DCI (e.g., a slot offset between a reception slot of the PDSCH and a transmission slot of an uplink channel (e.g., PUCCH) including the HARQ-ACK) is 2. The terminal may regard that the slot distance (e.g., slot offset) indicated by the DCI is a slot distance between the second PDSCH and the HARQ-ACK, and may transmit the HARQ-ACK in the slot (n+3) after two slots from the slot (n+1), which is a reception slot of the second PDSCH.

The terminal may successfully receive DCIs repeatedly transmitted in both the first PDCCH candidate and the second PDCCH candidate. Alternatively, the terminal may receive DCI in one of the first PDCCH candidate and the second PDCCH candidate, and may not receive DCI in the other PDCCH candidate. For example, the terminal may receive first DCI in the first PDCCH candidate of the slot n, and may not receive second DCI in the second PDCCH candidate of the slot (n+1). However, since the first DCI and the second DCI are repeatedly-transmitted DCIs (e.g., DCI formats including the same payload), even when the second DCI is not received, the terminal may identify a resource position of the second PDSCH by using scheduling information of the first DCI. That is, the terminal may assume that the second DCI is received even when the second DCI is not received, and may determine the resource position of the PDSCH scheduled by the second DCI. The second PDSCH and/or the second DCI may actually be transmitted. Alternatively, the second PDSCH and/or the second DCI may not be actually transmitted. Regardless of whether the second PDSCH and/or the second DCI is actually transmitted, the terminal may determine the HARQ-ACK timing (e.g., slot n+3) based on the assumed resource position of the second PDSCH (e.g., slot n+1). Even when the second DCI (e.g., DCI scheduling the PDSCH, which is a reference for deriving HARQ-ACK transmission timing) is received, and the first DCI (e.g., DCI scheduling another PDSCH) is not received, the terminal may determine the HARQ-ACK transmission timing (e.g., slot n+3) based on the resource position (e.g., slot n+1) of the second PDSCH. The above-described method may be referred to as (Method 210).

In (Method 210), the PDSCH, which is a reference for deriving the HARQ-ACK transmission timing, may be a PDSCH scheduled in a later resource. Specifically, the PDSCH scheduled in a later resource may be a PDSCH mapped to a later slot or a later symbol set. Alternatively, the PDSCH scheduled in a later resource may be a PDSCH having a later end symbol (or later start symbol). Alternatively, the PDSCH, which is a reference for deriving the HARQ-ACK transmission timing, may be a PDSCH scheduled in an earlier resource. Specifically, the PDSCH scheduled in an earlier resource may be a PDSCH mapped to an earlier slot or an earlier symbol set. Alternatively, the PDSCH scheduled in an earlier resource may be a PDSCH having an earlier end symbol (or earlier start symbol). As another method, the PDSCH, which is a reference for deriving the HARQ-ACK transmission timing, may be a PDSCH scheduled by a specific PDCCH candidate. For example, the specific PDCCH candidate may be a PDCCH candidate belonging to a search space set having a specific search space set ID, a PDCCH candidate belonging to a CORESET having a specific CORESET ID, or a PDCCH candidate belonging to a search space mapped to an earlier resource or a later resource.

In the above-described exemplary embodiment, DCIs transmitted in the first PDCCH candidate and the second PDCCH candidate may schedule repeatedly-transmitted PDSCHs. For example, a first PDSCH scheduled by the first PDCCH candidate may be repeatedly transmitted, and a second PDSCH scheduled by the second PDCCH candidate may be repeatedly transmitted. In this case, HARQ-ACK transmission timing for a scheduled TB may be determined based on a resource position of the last PDSCH (or PDSCH instance) constituting the repetitions of the first PDSCH or the repetitions of the second PDSCH. For example, the transmission timing (e.g., transmission slot) of the HARQ-ACK for the scheduled TB may be determined based on a resource position (e.g., slot) of the last PDSCH (or, PDSCH instance) constituting repetitions of a PDSCH allocated in a later resource (e.g., repetitions of the second PDSCH). In addition, when different repetitive PDSCH transmissions are scheduled by repeatedly-transmitted DCIs, each PDSCH (or each PDSCH instance) constituting one repetitive PDSCH transmission (e.g., repetitions of the first PDSCH) may be allocated in a resource prior to all PDSCHs (or PDSCH instances) constituting another repetitive PDSCH transmission (e.g., repetitions of the second PDSCH).

In the above-described exemplary embodiment, the terminal may receive the same DCI (e.g., same DCI format) in the first and second PDCCH candidates associated with each other. Alternatively, the terminal may receive different DCIs (e.g., different DCI formats) in each of the first and second PDCCH candidates associated with each other. For example, the terminal may receive DCI (e.g., DCI format) scheduling a different TB from each of the first PDCCH candidate and the second PDCCH candidate associated with each other. This operation may be performed when a resource of at least one PDCCH candidate among the first PDCCH candidate and the second PDCCH candidate completely overlaps a resource of a PDCCH candidate belonging to a different search space set (e.g., different USS set). In this case, the transmission timing of the HARQ-ACK corresponding to the scheduled TB may be determined by a method other than (Method 210). That is, (Method 210) may be used in limited cases excluding the above-described case. For example, in the above-described case, the terminal may determine the transmission timing (e.g., slot, subslot) of the HARQ-ACK corresponding to the PDSCH scheduled by each DCI based on the resource position where each PDSCH is scheduled, and transmit each HARQ-ACK at the determined transmission timing.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
receiving configuration information of one or more resource sets for a physical downlink control channel (PDCCH) monitoring operation from a base station;
performing the PDCCH monitoring operation in the one or more resource sets;
receiving at least one downlink control information (DCI) including scheduling information of a first physical downlink shared channel (PDSCH) by the PDCCH monitoring operation; and
receiving the first PDSCH based on the scheduling information,
wherein the one or more resource sets include a first search space and a second search space for PDCCH repeated transmissions, the first search space is used for transmission of a first DCI, and the second search space is used for transmission of a second DCI, the at least one DCI is at least one of the first DCI and the second DCI, the first DCI and the second DCI include same payload, a format of the first DCI is identical to a format of the second DCI, and the same payload is repeatedly transmitted in the first search space and the second search space,
when the first DCI and the second DCI do not include TCI state information for the first PDSCH, a reception operation of the first PDSCH is performed based on an assumption that the first PDSCH has QCL relation with a CORESET having a lower identifier among a first CORESET associated with the first search space and a second CORESET associated with the second search space.

2. The operation method according to claim 1, wherein the first DCI is received based on information on a quasi-co-location (QCL) of a first control resource set (CORESET) associated with the first search space, the second DCI is received based on information on a QCL of a second CORESET associated with the second search space, and the information on the QCL of the first CORESET and the information on the QCL of the second CORESET are determined independently of each other.

3. The operation method according to claim 1, wherein, when a first CORESET associated with the first search space is identical to a second CORESET associated with the second search space, the first DCI and the second DCI are received based on information on same QCL.

4. The operation method according to claim 1, wherein the first PDSCH is received based on transmission configuration information (TCI) state information for the first PDSCH, configuration information of a first CORESET associated with the first search space includes first information indicating whether the TCI state information is included in the first DCI, configuration information of a second CORESET associated with the second search space includes second information indicating whether the TCI state information is included in the second DCI, and the first information is identical to the second information.

5. The method according to claim 1, wherein the first search space and the second search space are configured as same search space set type, and the same search space set type is a terminal specific search space or a common search space.

6. The operation method according to claim 1, wherein a first PDCCH including the first DCI is transmitted through a first PDCCH candidate of the first search space, a second PDCCH including the second DCI is transmitted through a second PDCCH candidate of the second search space, and the first PDCCH candidate and the second PDCCH candidate have same control channel element (CCE) aggregation level and same PDCCH candidate index.

7. The operation method according to claim 6, wherein the first PDCCH candidate is configured to be connected to the second PDCCH candidate for the PDCCH repeated transmissions.

8. The operation method according to claim 6, wherein the performing the PDCCH monitoring operation includes, when the first PDCCH candidate satisfies a predefined condition, performing a monitoring operation of the second PDCCH candidate without performing a monitoring operation of the first PDCCH candidate.

9. The operation method of claim 8, wherein the predefined condition includes at least one of a condition in which the first PDCCH candidate overlaps with a synchronization signal/physical broadcast channel (SS/PBCH) block, a condition in which the first PDCCH candidate overlaps with a physical random access channel (PRACH) resource, a condition in which the first PDCCH candidate overlaps an uplink symbol, and a condition in which the first search space is excluded from mapping by a search space mapping rule.

10. An operation method of a base station in a communication system, the operation method comprising:
transmitting configuration information of one or more resource sets for a physical downlink control channel (PDCCH) monitoring operation to a terminal;
transmitting at least one downlink control information (DCI) including scheduling information of a first physical downlink shared channel (PDSCH) in the one or more resource sets to the terminal; and
transmitting the first PDSCH to the terminal based on the scheduling information,
wherein the one or more resource sets include a first search space and a second search space for PDCCH repeated transmissions, the first search space is used for transmission of a first DCI, and the second search space is used for transmission of a second DCI, the at least one DCI is at least one of the first DCI and the second DCI, the first DCI and the second DCI include same payload, a format of the first DCI is identical to a format of the second DCI, and the same payload is repeatedly transmitted in the first search space and the second search space,
when the first DCI and the second DCI do not include TCI state information for the first PDSCH, a reception operation of the first PDSCH in the terminal is performed based on an assumption that the first PDSCH has QCL relation with a CORESET having a lower identifier among a first CORESET associated with the first search space and a second CORESET associated with the second search space.

11. The operation method according to claim 10, wherein information on a quasi-co-location (QCL) of a first control resource set (CORESET) associated with the first search space is determined independently from information on a QCL of a second CORESET associated with the second search space.

12. The operation method according to claim 10, wherein configuration information of a first CORESET associated with the first search space includes first information indicating whether transmission configuration information (TCI) state information is included in the first DCI, configuration information of a second CORESET associated with the second search space includes second information indicating whether the TCI state information is included in the second DCI, and the first information is identical to the second information.

13. The method according to claim 10, wherein the first search space and the second search space are configured as same search space set type, and the same search space set type is a terminal specific search space or a common search space.

14. The operation method according to claim 10, wherein a first PDCCH including the first DCI is transmitted through a first PDCCH candidate of the first search space, a second PDCCH including the second DCI is transmitted through a second PDCCH candidate of the second search space, and the first PDCCH candidate and the second PDCCH candidate have same control channel element (CCE) aggregation level and same PDCCH candidate index.

15. The operation method according to claim 14, wherein the first PDCCH candidate is configured to be connected to the second PDCCH candidate for the PDCCH repeated transmissions.

* * * * *